United States Patent
Angle et al.

(10) Patent No.: US 6,771,596 B1
(45) Date of Patent: *Aug. 3, 2004

(54) BACKPRESSURE MECHANISM FOR A NETWORK DEVICE

(75) Inventors: Richard L. Angle, Wellasley Hills, MA (US); Shantigram V. Jagannath, Cambridge, MA (US); Geoffrey B. Ladwig, Chelmsford, MA (US); Nanying Yin, Newton Centre, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/234,689

(22) Filed: Sep. 4, 2002

Related U.S. Application Data

(63) Continuation of application No. 09/311,995, filed on May 14, 1999, now Pat. No. 6,519,225.

(51) Int. Cl.$^7$ .............................................. H04L 12/56
(52) U.S. Cl. ........................ 370/229; 370/389; 370/390
(58) Field of Search .............................. 370/389, 395.1, 370/390, 229, 230.1, 230, 235.1, 236

(56) References Cited

U.S. PATENT DOCUMENTS

| | | | |
|---|---|---|---|
| 5,267,235 A | 11/1993 | Thacker | 370/60 |
| 5,493,566 A | 2/1996 | Ljungberg et al. | 370/231 |
| 5,500,858 A | 3/1996 | McKeown | 370/60 |
| 5,577,035 A * | 11/1996 | Hayter et al. | |
| 5,724,351 A | 3/1998 | Chao et al. | |
| 5,742,606 A | 4/1998 | Iliadis et al. | 370/413 |
| 5,835,491 A | 11/1998 | Davis | 37/386 |
| 5,875,190 A | 2/1999 | Law | |
| 5,978,359 A | 11/1999 | Caldara et al. | 370/236 |
| 6,141,346 A | 10/2000 | Caldara et al. | 370/390 |
| 6,157,967 A | 12/2000 | Horst et al. | |
| 6,188,690 B1 | 2/2001 | Holden et al. | |
| 6,201,789 B1 | 3/2001 | Witkowski | 370/230 |
| 6,201,792 B1 * | 3/2001 | Lahat | 370/236 |
| 6,212,182 B1 | 4/2001 | McKeown | |
| 6,259,698 B1 | 7/2001 | Shin et al. | 370/395 |
| 6,295,295 B1 | 9/2001 | Wicklund | |
| 6,324,165 B1 | 11/2001 | Fan et al. | 370/232 |

FOREIGN PATENT DOCUMENTS

| | | |
|---|---|---|
| EP | 0785697 A | 7/1997 |
| EP | 0687091 A | 12/1997 |

OTHER PUBLICATIONS

N. McKeown and T.E. Anderson, "A Quantitative Comparison Of Interative Scheduling Algorithms For Input–Queued Switches", Internet Draft, pp 1–25.

(List continued on next page.)

Primary Examiner—Kenneth Vanderpuye
(74) Attorney, Agent, or Firm—Blakely Sokoloff Taylor & Zafman

(57) ABSTRACT

A method and apparatus are provided for scheduling multicast data in an input-queued network device. A fabric arbiter receives a transmit request associated with multiple input ports. The transmit request identifies those of the output ports to which pending multicast cells are ready to be transmitted, if any. The fabric arbiter receives a backpressure signal from a backpressuring output port. Then, based upon the backpressure signal the fabric arbiter schedules multicast cells for transmission across the fabric. If the size of a multicast queue exceeds a predetermined threshold, then the fabric arbiter ignores the backpressure signal and causes the head-of-line multicast cell from the multicast queue to be transferred to the backpressuring output port. Otherwise, the fabric arbiter prevents multicast cells from being transferred to the backpressuring output port by masking requests destined for the backpressuring output port thereby removing the backpressuring output port from consideration during multicast scheduling.

12 Claims, 16 Drawing Sheets

OTHER PUBLICATIONS

N. W. McKeown, "Scheduling Algorithms For Input–Queued Cell Switches", 1995 thesis, Graduate Division University of California at Berkeley, pp 1–119.

N. McKeown, P. Varaiya and J. Walrand, "Scheduling Cells In An Input–Queued Switch", Internet Draft, Pub. in Electronis Letters, Dec./93, pp 1–4.

B. Prabhakar, N. McKeown and R. Ahuja, "Multicast Scheduling For Input–Queued Switches", Internet Draft, pp 1–20.

B. Prabhakar, N. McKeown and J. Mairesse, "Teris Models For Multicast Switches", Internet Draft, 6 pages.

N. McKeown and B. Prabhakar, "Scheduling Multicast Cells In An Input–Queued Switch", Internet Draft, 8 pages.

A. Mekkittikul and N. McKeown, "A Starvation–Free Algorithm For Achieving 100% Throughput In An Input–Queued Switch", Internet Draft, 6 pages.

B. Prabhakar and N. McKeown, "Designing A Multicast Switch Scheduler", Internet Draft, pp 1–10.

N. McKeown, V. Anantharam and J. Warland, "Achieving 100% Throughput In An Input–Queued Switch", Internet Draft, 7 pages.

N. McKeown, "Fast Switched Backplane For A Gigabit Switched Router", White Paper, Nov., 1997, pp 1–30.

J.F. Hayes, R. Breault and M.K. Mehmet–Ali, "Performance Analysis Of A Multicase Switch", IEEE Transactions On Communications, vol. 39, No. 4, Apr., 1991, pp 581–587.

J.Y. Hui and T. Renner, "Queueing Analysis For Multicasr Packet Switching", IEEE Transactions On Communications, vol. 42, No. 2/3/4, 1994, pp 723–731.

P. Gupta and N. McKeown, "Design And Implementation Of A Fast Crossbar Scheduler", Internet Draft, 8 pages.

S. Chuang, A. Goel, N. McKeown and B. Prabhakar, "Matching Output Queueing With A Combined Input Output Queued Switch", Internet Draft, pp 1–25.

B. Prabhakar and N. McKeown, "On the Speedup Required For Combined Input And Output Queued Switching", pp 1–13.

A. Hung, G Kesidia and N. McKeown, "ATM Input–Buffered Switches With The Guaranteed–Rate Property", Internet Draft, 5 pages.

A. Mekkittikul and N. McKeown, "A Practical Scheduling Algorithm To Achieve 100% Throughput In Input–Queued Switches", Internet Draft, 8 pages.

N. McKeown, B. Prabhakar and M. Zhu, "Matching Output Queueing With Combined Input And Output Queueing", Internet Draft, 9 pages.

B. Prabhakar, N. McKeown and R. Ahuja, "Multicast Scheduling For Input–Queued Switches", Internet Draft, pp 1–20.

B. Phabhakar, N. McKeown and J. Mairesse, "Tetris Models For Multicast Switches", Internet Draft, 6 pages.

N. McKeown and B. Prabhakar, "Scheduling Multicast Cells In An Input–Queued Switch", Internet Draft, 8 pages.

A. Mekkittikul and N. McKeown, "A Starvation–Free Algorithm For Achieving 100% Throughput In An Input–Queued Switch", Internet Draft, 6 pages.

B. Prabhakar and N. McKeown, "Designing A Multicast Switch Scheduler", Internet Draft, pp 1–10.

N. McKeown, V. Anantharam and J. Walrand, "Achieving 100% Throughput In An Input–Queued Switch", Internet Draft, 7 pages.

N. McKeown and T.E. Anderson, "A Quantitative Comparison Of Interative Scheduling Algorithms For Input–Queued Switches", Internet Draft, pp 1–25.

N. W. McKeown, "Scheduling Alogrithms For Input–Queued Cell Switches", 1995 thesis, Graduate Division University of California at Berkeley, pp 1–119.

N. McKeown, P. Varaiya and J. Walrand, "Scheduling Cells In An Input–Queued Switch", Internet Draft, Pub. in Elelctronics Letters, Dec./93, pp 1–4.

Minkenberg, C., "Integrating Unicast and Multicast Traffic Scheduling in a Combined Input and Output–Queued Packet–Switching System," IEEE May 2000, pp. 127–134.

Lakshman, T.V., Bagchi, A., and Rastani, K., "A Fast Parallel for Resource Requests Implemented Using Optical Devices," IEEE pp. 169–172.

Tseng, W.Y., and Kuo, S. Y., "A Combinational Media Access Protocol for Multicast Traffic in Single–Hop WDM LANS," IEEE Sep. 1998, pp. 294–299.

Nong, G. and Hamdi, M., "On the Provision of Integrated QoS Guarantees of Unicast and Multicast Traffic Input–Queued Switches," IEEE Global Telecommunications Conference, May 1999, pp. 1742–1746.

Andrews, M., Khanna, S., and Kumaran, K., "Integrated Scheduling of Unicast and Multicast Traffic in an Input–Queued Switch," IEEE Jun. 1999, pp. 1144–1151.

McKeown, N., Izzard, M., Mekkittikul, A., Ellersick, W., and Horowitz, M., "The Tiny Tera: A Packet Switch Core," Texas Instruments & Center for Telecommunications at Stanford University, XP–002235664.

* cited by examiner

BACKPRESSURE MECHANISM FOR A NETWORK DEVICE

COPYRIGHT NOTICE

This application is a Continuation application of Ser. No. 09/311,995, filed on May 14, 1999, U.S. Pat. No. 6,519,225 entitled "Backpressure Mechanism For A Network Device".

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a method and apparatus for providing efficient unicast and multicast scheduling and high throughput for both unicast and multicast traffic. The method and apparatus may be embodied in a network device, such as a router or switch that employs input buffering and a switched backplane architecture.

2. Description of the Related Art

The current trend in high performance routers is away from shared backplanes that allow only a single bus transaction at a time (e.g., the transfer of one packet across the bus) and toward much faster switched backplanes that support multiple bus transactions at once (e.g., the forwarding of packets across the backplane by multiple ports simultaneously). For convenience, typically, packets are transferred across the switched backplane in fixed size "cells." In this manner, the scheduling of the backplane's input and output ports may be synchronized in fixed size increments of time referred to herein as "time slots," "cell scheduling cycles," or "cell cycles." A scheduling algorithm is employed to determine a "configuration" of the backplane for a particular time slot by identifying non-conflicting pairs of inputs and outputs which may be connected during the time slot. Because efficient scheduling of the backplane is important to the performance of the system as a whole, much time and effort has been spent developing and evaluating various scheduling approaches.

The recently developed ESLIP algorithm is an example of one of the more advanced scheduling approaches. The ESLIP algorithm is an enhanced version of iSLIP, an iterative unicast scheduling algorithm. Recognizing the importance of efficiently supporting multicast traffic, ESLIP combines unicast and multicast scheduling. The implementation of the ESLIP algorithm involves scheduling both unicast and multicast traffic simultaneously in a single scheduler. Consequently, to support multiple classes of service, the ESLIP scheduler needs to choose between competing unicast and multicast cells having the same priority. The ESLIP algorithm resolves contention between unicast and multicast cells of the same priority by alternating its preference between multicast and unicast each cell cycle. In this manner, both multicast and unicast traffic may be transferred across the backplane each cell cycle. During one cell cycle, unicast queues representing a particular priority are chosen to source a cell before multicast queues representing the same priority; and in the subsequent cell cycle, multicast cells are favored over unicast cells of equal priority. A more detailed description of ESLIP can be found in N. McKeown, "Fast Switched Backplane for a Gigabit Switched Router," Cisco Systems white paper, November 1997.

While the ESLIP algorithm is admirable in terms of its performance, it has some limitations in terms of flexibility, predictability of scheduling delay, and variability of packet delay. With regard to flexibility, notably, there is no mechanism by which the frequency of multicast servicing can be varied. The fixed alternating priority scheme suggested by the ESLIP algorithm schedules both multicast and unicast traffic every time slot. With regard to delay, it is desirable to have guaranteed deterministic and bounded delay for a high priority multicast cell at the head of its queue. Additionally, it is advantageous to minimize the variability of packet delay. For example, output link scheduling can be made more efficient if low packet delay variability across the backplane can be achieved.

In addition, prior art schedulers have various other disadvantages that are overcome by aspects of the present invention, as described in the detailed description which follows.

BRIEF SUMMARY OF THE INVENTION

A method and apparatus for scheduling multicast data in an input-queued network device are described. According to one aspect of the present invention, the head-of-line blocking problem is avoided for multicast queues. A fabric arbiter receives a transmit request associated with multiple input ports. The transmit request identifies those of the output ports to which pending multicast cells are ready to be transmitted, if any. The fabric arbiter receives a backpressure signal from a backpressuring output port. Then, based upon the backpressure signal the fabric arbiter schedules multicast cells for transmission across the fabric. If the size of a multicast queue exceeds a predetermined threshold, then the fabric arbiter ignores the backpressure signal and causes the head-of-line multicast cell from the multicast queue to be transferred to the backpressuring output port. Otherwise, the fabric arbiter prevents multicast cells from being transferred to the backpressuring output port by masking requests destined for the backpressuring output port thereby removing the backpressuring output port from consideration during multicast scheduling.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus are described for scheduling unicast and multicast traffic in an input-queued network device. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

Assuming sufficient processing speed can be made available to accommodate cell scheduling time constraints, it is envisioned that the present invention may also be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, flash memory, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Importantly, while embodiments of the present invention will be described with respect to a network device, such as a router, or a Layer 2 or Layer 3 switch operable within a TCP/IP network, the method and apparatus described herein are equally applicable to Asynchronous Transfer Mode (ATM) networks and networking devices, and other devices such as multiprocessing computers, for example. Additionally, while various embodiments of the present invention are described in connection with a networking device that recognizes four different classes of service, the method and apparatus described herein are not limited to such a configuration.

Exemplary Network Device Architecture

Figure 1:
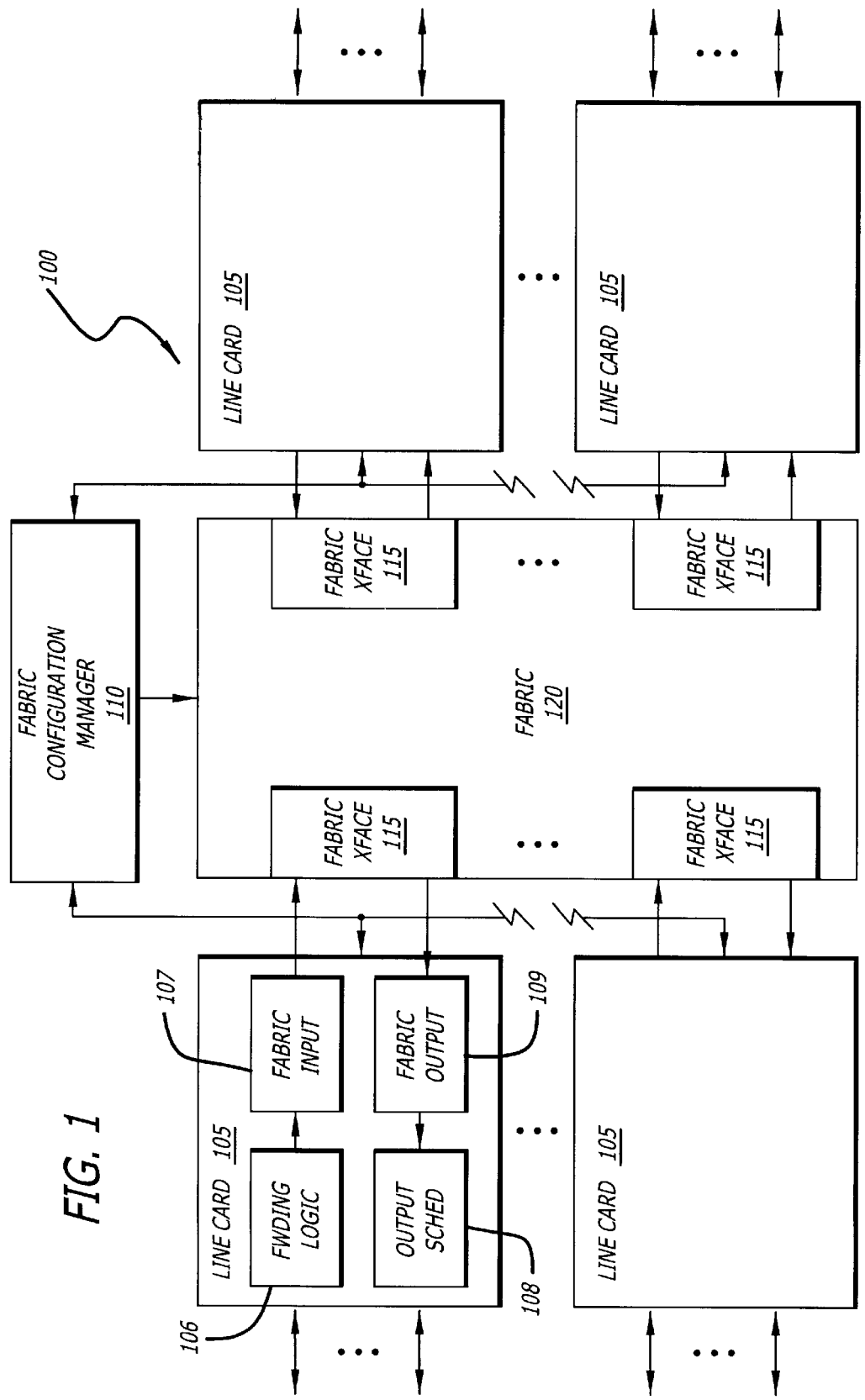
FIG. 1 is a simplified block diagram of a network device according to one embodiment of the present invention.

A simplified block diagram illustrating an exemplary network device 100 employing a switched backplane architecture will briefly be described with reference to FIG. 1. According to the embodiment depicted, the network device 100 includes a plurality of line cards 105, a fabric 120, and a fabric configuration manager 110 (also referred to as the fabric arbiter). Each of the line cards 105 is coupled to a corresponding fabric interface 115 of the fabric 120. The line cards 105 each include forwarding logic 106, a fabric input 107 (also referred to as an input port), output scheduling logic 108, and a fabric output 109 (also referred to as an output port). According to one embodiment, the forwarding logic 106 determines the output port(s) to which received packets need to be forwarded and performs other Internet Protocol (IP) header processing, such as appending the next hop Media Access Control (MAC) address retrieved from a forwarding database (not shown), updating the time-to-live (TTL) field, and calculating a new header checksum.

According to one embodiment, in order to simplify processing throughout the network device 100, packets are segmented into fixed length cells before being queued for transfer across the fabric 120 at the fabric input 107. The fabric input 107 may include a set of virtual output queues (VOQs) (not shown) for each class of service supported. By providing a dedicated queue per fabric input 107 per class of service, the head-of-line blocking phenomenon experienced in simple input buffered networking devices that employ a single first-in-first-out (FIFO) queue is eliminated. The fabric input 107 may also include a dedicated multicast queue (not shown) for multicast traffic for each class of service.

The fabric 120 allows multiple line cards 105 to communicate with each other simultaneously. According to one embodiment, the fabric 120 comprises a crossbar switch. Advantageously, since all crossbars are internally non-blocking, every input and output port is capable of transferring data simultaneously during each time slot. A crossbar implementation is additionally advantageous due to its simplicity and its ability to deliver multicast data to multiple outputs simultaneously by replicating cells within its interconnected fabric.

The novel fabric configuration manager 110 is coupled to each line card 105 and the fabric 120. At the beginning of each cell scheduling cycle, through its interface with the line cards 105, the fabric configuration manager 110 may receive information regarding the cells that are ready for transmission across the fabric 120. Briefly, the fabric configuration manager 110 is responsible for determining a conflict-free matching of ports each time slot, configuring the fabric 120 to form connections between the appropriate fabric interfaces 115, and communicating the scheduling decisions to the fabric inputs 107. As will be described further below, the novel fabric configuration manager 110 includes independent unicast and multicast schedulers that allow flexible scheduling, such as pipelined staging of multicast and unicast scheduling and programmable multicast scheduling frequency.

The output scheduling logic 108 is coupled to the fabric output 109 to schedule the time at which cells are reassembled into packets and transmitted on the output link. In order to meet specific quality of service (QoS) requirements associated with the classes of service supported, the fabric output 109 may include a dedicated output queue per class of service.

The functional units described above may be implemented separately or in various combinations in various types of programmable or hardcoded logic, such as FPGAs, TTL logic, or an application specific integrated circuits (ASICs). Alternatively, the functional units described above may be implemented with a processor or other components of a programmed computer that perform a series of operations dictated by software or firmware, or a combination of hardware and software or firmware. Importantly, the present invention is not limited to a particular implementation of these functional units.

Exemplary Fabric Configuration Manager

The fabric configuration manager 110 ensures that queue lengths at the input and output ports are maintained at reasonable levels and that the amount of delay experienced by packets traversing the network device is low. The fabric configuration manager 110 seeks to achieve these goals by providing ample service bandwidth to all ports. Responsive to transmission requests received from the input ports 107, the fabric configuration manager 110 provides each of the input ports 107 with an equal opportunity to transfer cells to desired output ports 109. Additionally, the fabric configuration manager 110 employs a novel mechanism to combine multicast and unicast scheduling cycles which allows variable rate multicast servicing to be achieved while supplying both types of traffic with fair access to the fabric 120.

Figure 2:
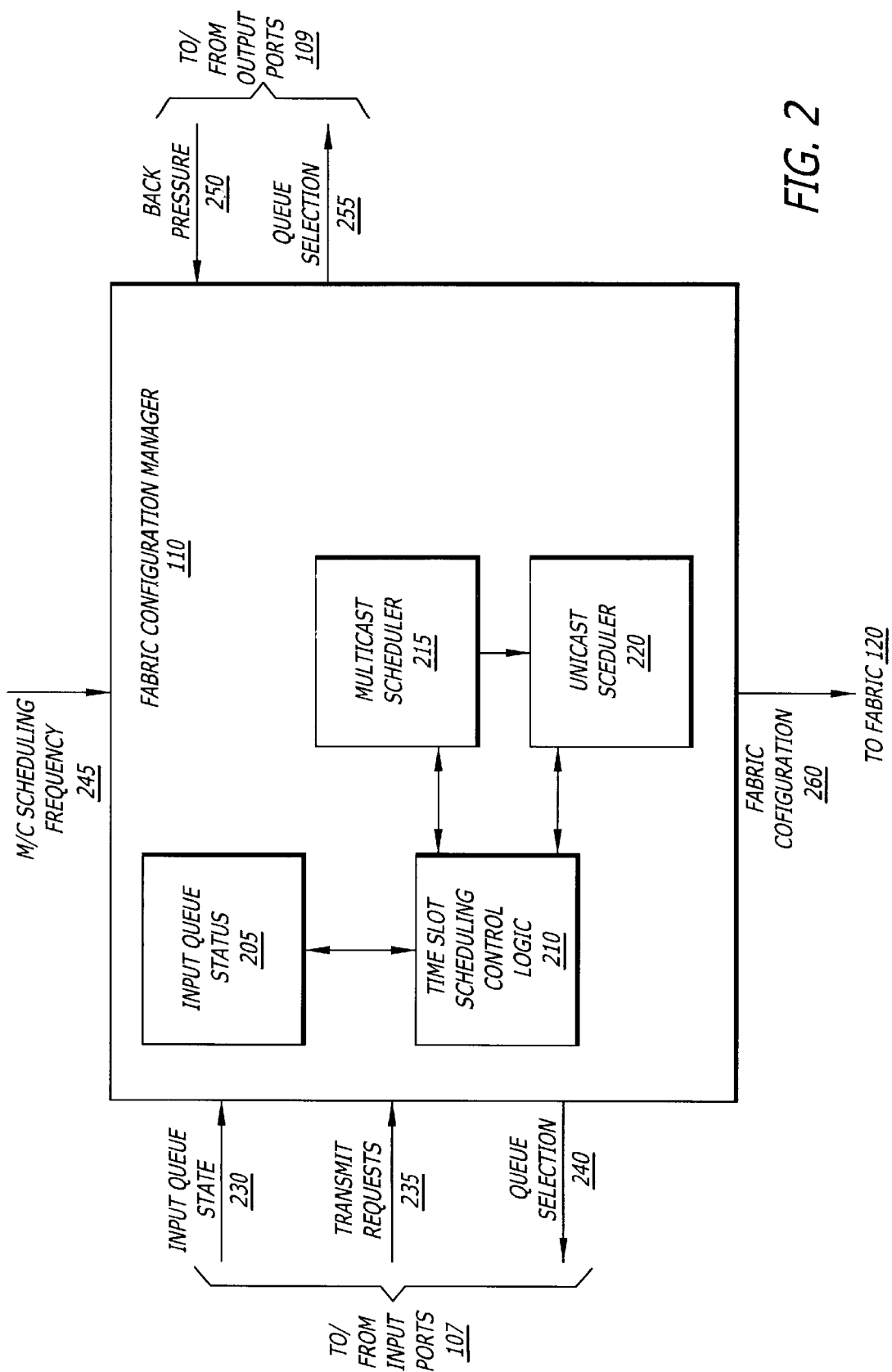
FIG. 2 is a high level block diagram of various functional units that may be employed in a fabric configuration manager according to one embodiment of the present invention.

Referring now to FIG. 2, various functional units will now be described that may be employed in the fabric configuration manager 110 according to one embodiment of the present invention. In the embodiment depicted, the fabric configuration manager 110 includes an input queue status block 205, time slot scheduling control logic 210, a multicast scheduler 215, and a unicast scheduler 220.

The multicast scheduler 215 implements a fabric arbitration algorithm for multicast cells. The multicast scheduler 215 seeks to provide bounded scheduling delay and low variability by transferring at least one high priority multicast cell completely in each multicast scheduling cycle. Importantly, this preference also simplifies the implementation of the multicast scheduler 215 and takes advantage of the multicast capability of the fabric 120. Details regarding the implementation of the multicast scheduler 215 and the processing performed by the multicast scheduler 215 are described below.

The unicast scheduler 220 implements a fabric arbitration algorithm for unicast cells. In one embodiment, the unicast scheduler 220 operates in accordance with the iSLIP unicast scheduling algorithm which is described below. However, in other embodiments, a variety of other unicast scheduling approaches may be employed such as, Programmable Iterative Matching (PIM), iterative Longest Queue First (i-LQF), iterative Oldest Cell First (i-OCF) or variants and combinations thereof.

The time slot scheduling control logic 210 initiates multicast and unicast scheduling during the appropriate scheduling time slots. In one embodiment, unicast scheduling is performed every time slot while multicast scheduling is performed every other time slot. In another embodiment, the frequency at which multicast scheduling is performed is a programmable parameter, e.g., multicast scheduling frequency 245, that may be provided by the network administrator, for example. Assuming that a time slot is not long enough to allow both multicast scheduling and unicast scheduling to be completed if performed sequentially, according to one embodiment, the scheduling of multicast and unicast cells that are to be delivered during the same time slot may be staged in a pipelined fashion. For example, multicast scheduling may be performed in advance of the time slot in which the results are used. In this manner, during time slots in which only unicast cells are transferred across the fabric 120, both multicast and unicast scheduling may be performed independently and in parallel. During time slots in which both multicast and unicast cells are to be transferred, the results of the multicast scheduling cycle that were performed in advance are fed into the unicast scheduler 220 and the unicast scheduler 220 then schedules unicast cells whose ports are not being used by the previously scheduled multicast cells. Importantly, while specific multicast and unicast scheduling approaches are described herein, the mechanism for producing a combined schedule is not limited to these particular approaches. The novel separation and pipelined staging of multicast and unicast scheduling and the parallel operation of the multicast and unicast scheduling that will be described further below are equally applicable to other current and future scheduling approaches.

In the embodiment depicted, the fabric configuration manager 110 has control information interfaces with the input ports 107, the output ports 109, and the fabric 120.

Control information generated by the fabric configuration manager 110 includes information regarding queue selection 240 and 255 which is sent each time slot to those of the input ports and output ports participating in the schedule generated by the multicast scheduler 215 and/or the unicast scheduler 220. Additionally, each time slot, the fabric configuration manager 110 produces a fabric configuration 260 based upon the current schedule. The fabric configuration 260 is communicated to the fabric 120 each time slot to activate the fabric 120 and cause the fabric 120 to form appropriate connections among the fabric interfaces 115 to accommodate the current schedule.

In this example, control information received by the fabric configuration manager 110 from the input ports 107 includes input queue state information 230 and transmit requests 235. According to one embodiment, input queue state information 230 comprises information on newly received cells such as an indication of the queue with which the cell is associated (identified by the port and the class of service, for example) and the output port(s) to which the cell is destined. In this manner, the current state of the queues at each of the input ports may be maintained in the input queue status block 205. In alternative embodiments, queue status may be kept at the input ports 107.

Transmit requests 235 may be received from the input ports 107 at the beginning of each time slot. The transmit requests 235 identify the output port(s), if any, to which the corresponding input port has a cell ready to be transferred.

As will be described further below, the transmit requests 235 may be presented to one or both of the multicast scheduler 215 and the unicast scheduler 220 in the form of request vectors for each output port 109. Each request vector identifies those of the input ports 107 with requests for a particular output port 109.

The fabric configuration manager 110 also receives control information from the output ports 109. For example, a back pressure signal 250 may identify output ports 109 having one or more output queues that have exceeded a predetermined threshold of pending cells. Briefly, in network devices employing "speedup," e.g., those operating their fabrics faster than the input and output port capacity, a back pressure signaling mechanism is important to protect the output ports from excess traffic from the fabric. In prior architectures, a back pressure signal is typically coupled directly from each of the output ports 109 to each of the input ports 107. Typically, output ports assert their back pressure signal upon exceeding a predetermined threshold of pending cells. Subsequently, when the number of pending cells falls below another predetermined threshold, the output port deasserts the back pressure signal. While an output port is back pressuring, input ports do not transfer cells to that output port. When VOQs are employed at the input ports 107, back pressure does not cause difficulties for unicast traffic since a head-of-line unicast cell destined for a back pressuring output only blocks other cells destined for the same output. However, a complication occurs for multicast traffic. When a particular output port is back pressuring, a head-of-line multicast cell blocks the rest of the cells in the multicast queue, which may or may not be destined for the back pressuring port. The novel back pressure mechanism described below provides for centralized back pressure handling and solves this head-of-line blocking problem for multicast traffic.

Multicast Scheduling

Figure 3:
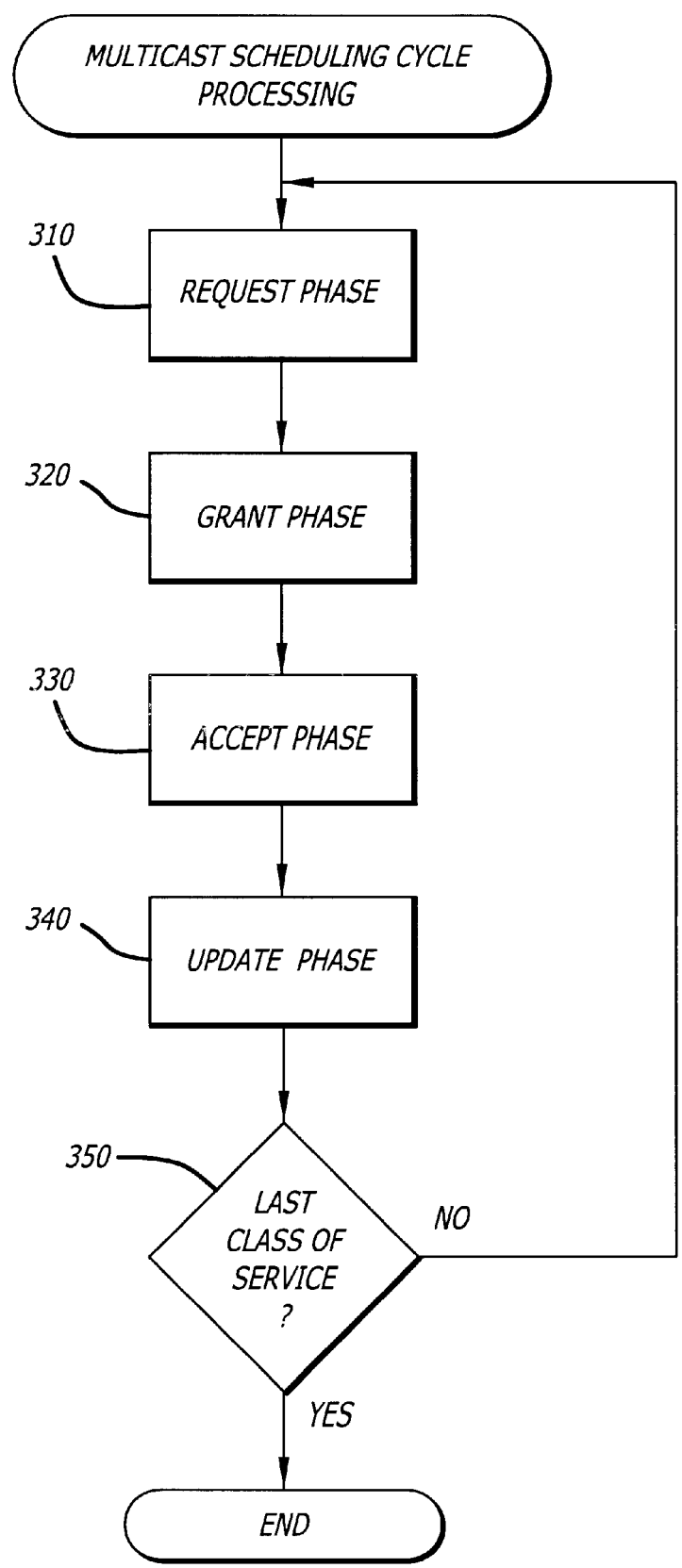
FIG. 3 is a flow diagram illustrating multicast scheduling processing according to one embodiment of the present invention.

Having described the environment in which the various features of the present invention may be implemented, multicast scheduling cycle processing will now be described with reference to the flow diagram of FIG. 3. Briefly, in the embodiment illustrated, the multicast scheduling cycle processing is broken down into four phases: a request phase, a grant phase, an accept phase, and an update phase. The four phases are repeated sequentially for each class of service in decreasing order of priority each multicast scheduling cycle. Advantageously, according to one feature of the present embodiment, only a single scheduling iteration is performed per class of service, thereby reducing the time required for multicast scheduling over prior multicast scheduling approaches.

At the beginning of each scheduling cycle, all input ports and output ports are initially unmatched. Only those that remain unmatched at the end of an iteration are available for matching in the next iteration. The scheduling cycle begins at step 310 by performing the request phase. During the request phase, each of the input ports 107 communicates a transmit request 235, in the form of a bit vector, for example, to the fabric configuration manager 110. Based upon the transmit requests 235, request vectors are formed for each output port 109. Recall, each request vector identifies those of the input ports 107 with requests for a particular output port 109. For purposes of illustration, the transformation of transmit requests 235 to request vectors may be thought of conceptually as accumulating transmit requests 235 as columns of a table and subsequently reading rows of the accumulated information to determine the corresponding request vectors.

At step 320, the grant phase is performed. During the grant phase, the multicast scheduler 215 evaluates the request vectors for the current class of service corresponding to those of the output ports that remain available for matching. The purpose of this evaluation is to determine a conflict-free matching of input ports 107 and output ports 109. According to one embodiment, in order to ensure that each of the input ports 107 is provided with fair access to the output ports 109, a single global indicator that identifies which of the input ports is to receive priority for the current scheduling cycle is maintained for each class of service. In one embodiment, this priority indicator comprises a modulo N counter, referred to as the global multicast round robin counter (GRRC), where N represents the number of ports. In this example, evaluating request vectors involves searching the request vector in a circular fashion starting from the input port 107 identified by the GRRC for the appropriate class of service. The first input port 107 in the request vector that has a request for the output port 109, and is available for matching is selected to receive access to the output port 109. Finally, after the request vectors for the current class of service have been evaluated, those of the output ports 109 that were matched during the current iteration should be marked as unavailable. In this manner, the matched output ports 109 are removed from further consideration in subsequent iterations of the scheduling cycle.

At step 330, the accept phase is performed. Since multicast cells may be destined for more than one output port 109, input ports 107 may receive grants from multiple output ports 109. During the accept phase, regardless of the number received, each input port 107 accepts all grants. This manner of acceptance expresses the multicast algorithm's preference for completely transferring at least one high priority multicast cell across the fabric 120 during each multicast scheduling cycle. Additionally, by accepting all grants, the multicast capability of the fabric 120 is utilized to perform cell replication. Finally, those of the input ports 107 that were matched during the current iteration should be marked as unavailable. In this manner, the matched input ports 107 are removed from further consideration in subsequent iterations of the scheduling cycle.

At step 340, the update phase is performed. During the update phase, the priority indicator, e.g., the GRRC, for the current class of service is incremented to point to the next input port that has a non-fully-granted request if any of the following criterion are met:

The cell at the head of the multicast queue associated with the input port identified by the priority indicator has been sent to all output ports to which it is destined, No cells are pending on the multicast queue, or One or more of the output ports to which the cell is destined was unavailable for matching during the scheduling cycle due to back pressure.

Importantly, the priority indicator for the highest priority class of service will always be incremented, since one of the above criteria will always be true for this class of service. Additionally, it should be noted that as a result of the processing described above, "fanout-splitting" is supported. If any of the output ports 109 that has a request from the input port 107 pointed to by the priority indicator is unavailable, the cell is partially delivered to those of the output ports 109 that are available. Therefore, a cell may be transferred to the output ports 109 to which it is destined over a number of scheduling cycles.

The update phase may also include updating the request vectors for use in the next iteration. In one embodiment, the request vectors may be modified based upon the accepts such that no requests will be presented in subsequent iterations from an input port that has accepted an output port and/or such that no requests will be presented to an output port that has been accepted by an input port.

At step 350, it is determined if the last class of service has been scheduled. If not, processing continues with step 310 for the next class of service. Otherwise, if the last class of service has been scheduled, then the multicast scheduling cycle is complete.

Figure 4:
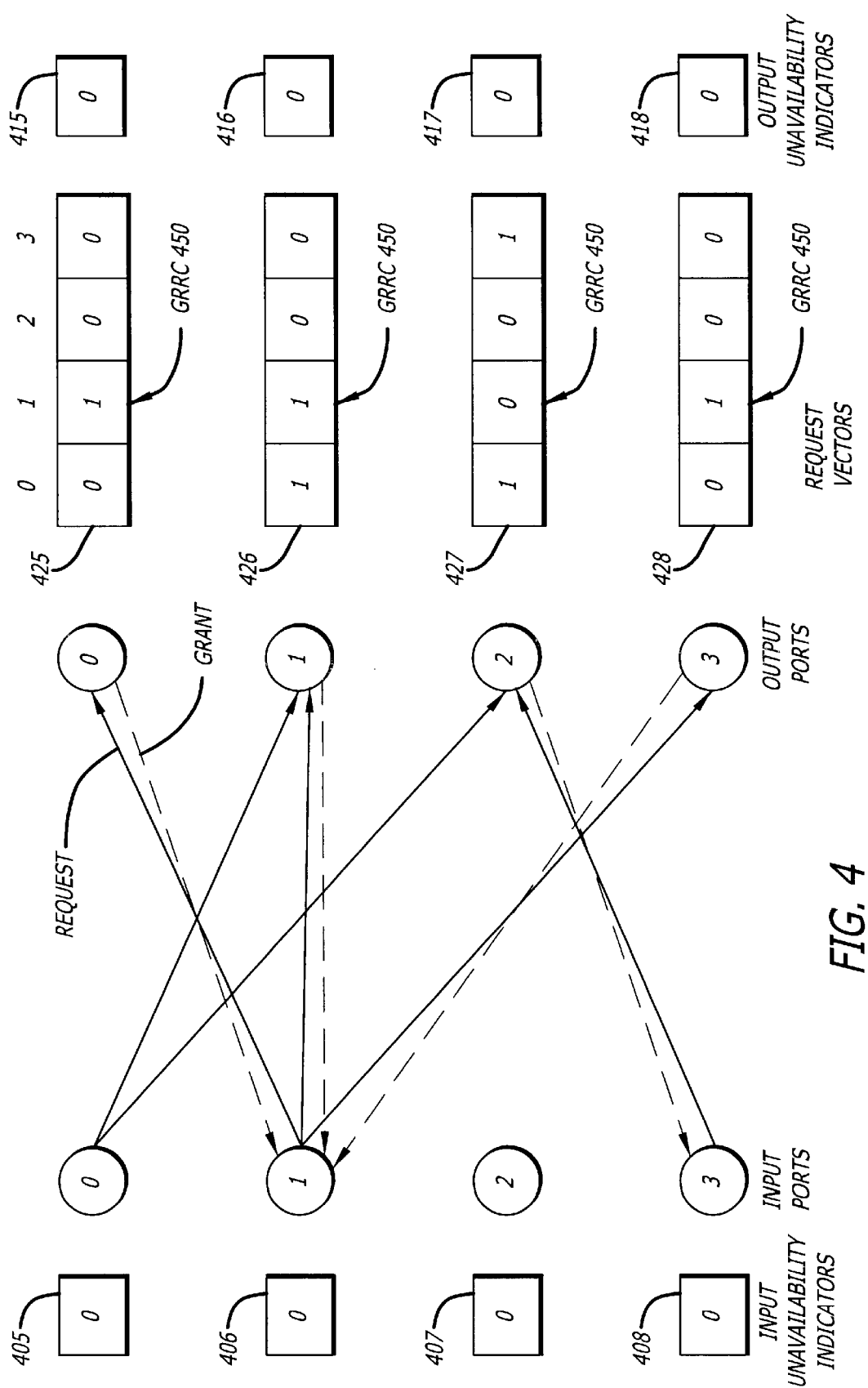
FIG. 4 conceptually illustrates a multicast scheduling cycle according to one embodiment of the present invention.

Referring now to FIG. 4, one iteration of an exemplary multicast scheduling cycle will be described. Communication of transmit request information is depicted as a solid line from an input port to an output port and grants are depicted as dotted lines from output ports to input ports. According to this example, there are four input ports numbered 0 to 3 and four output ports numbered 0 to 3. The input ports each have a corresponding unavailability indicator 405–408. Similarly, each output port has a corresponding unavailability indicator 415–418. In this example, the global priority indicator comprises a GRRC 450 which currently points to input port 1. Therefore, input port 1 will receive priority over the other input ports during this scheduling cycle.

In this example, input port 0 has a multicast cell ready for delivery to output ports 1 and 2, the head-of-line multicast cell at input port 1 is destined for output ports 0, 1 and 3, no multicast cells are pending at input port 2, and input port 3 has a multicast cell that is ready to be transferred to output port 2. While, in reality, this control information is communicated from the input ports 107 to the fabric configuration manager 110, for purposes of this example, the communication is conceptually represented as being communicated between input ports 0–3 and output ports 0–3. At any rate, during the request phase (step 310) the input ports each communicate their transmit request information to the output ports.

The transmit request information accumulated at output port 0 forms request vector 425. Similarly, request vectors 426–428 are formed at output ports 1–3, respectively. The request vectors 425–428 have a bit position corresponding to each of the input ports 0–3. A bit is set in the request vectors 435–428 when the corresponding input port has a multicast cell ready for delivery to the output port. The bit remains clear if the corresponding input port has no cell destined for the output port.

During the grant phase (step 320), each output port that is available searches its corresponding request vector 425–428, respectively, in a circular fashion beginning with the input port identified by GRRC 450 to select the first available input port 0–3 that has a request for that output port. In this example, the first available input port that has a request for output port 0 is input port 1. Input port 1 is also the first available input port that has a request for output port 1. Output port 2 selects input port 3 and output port 3 selects input port 1. After the output ports have selected an input port, grants are issued to those of the input ports that have been selected and those of the output ports that gave a grant to an input port set their corresponding unavailability indicators. In this example, therefore, all of the output ports would set their output unavailability indicators 415–418.

During the accept phase (step 330), each input port accepts all grants received and each input port that received at least one grant sets its input unavailability indicator 405–408. In this example, input ports 1 and 3 would set their corresponding unavailability indicators. Therefore, input ports 1 and 3 would not participate in subsequent iterations until a new scheduling cycle begins.

During the update phase (step 340), the GRRC update criteria are evaluated and the GRRC 450 is incremented to point to input port 2. Therefore, in the next scheduling cycle, input port 2 will receive priority over input ports 0, 1 and 3.

Assuming the fabric 120 were configured according to this scheduling cycle iteration, the multicast cell from input port 3 would be delivered to output port 2 and the multicast cell from input port 1 would be delivered to output ports 0, 1 and 3.

Figure 5:
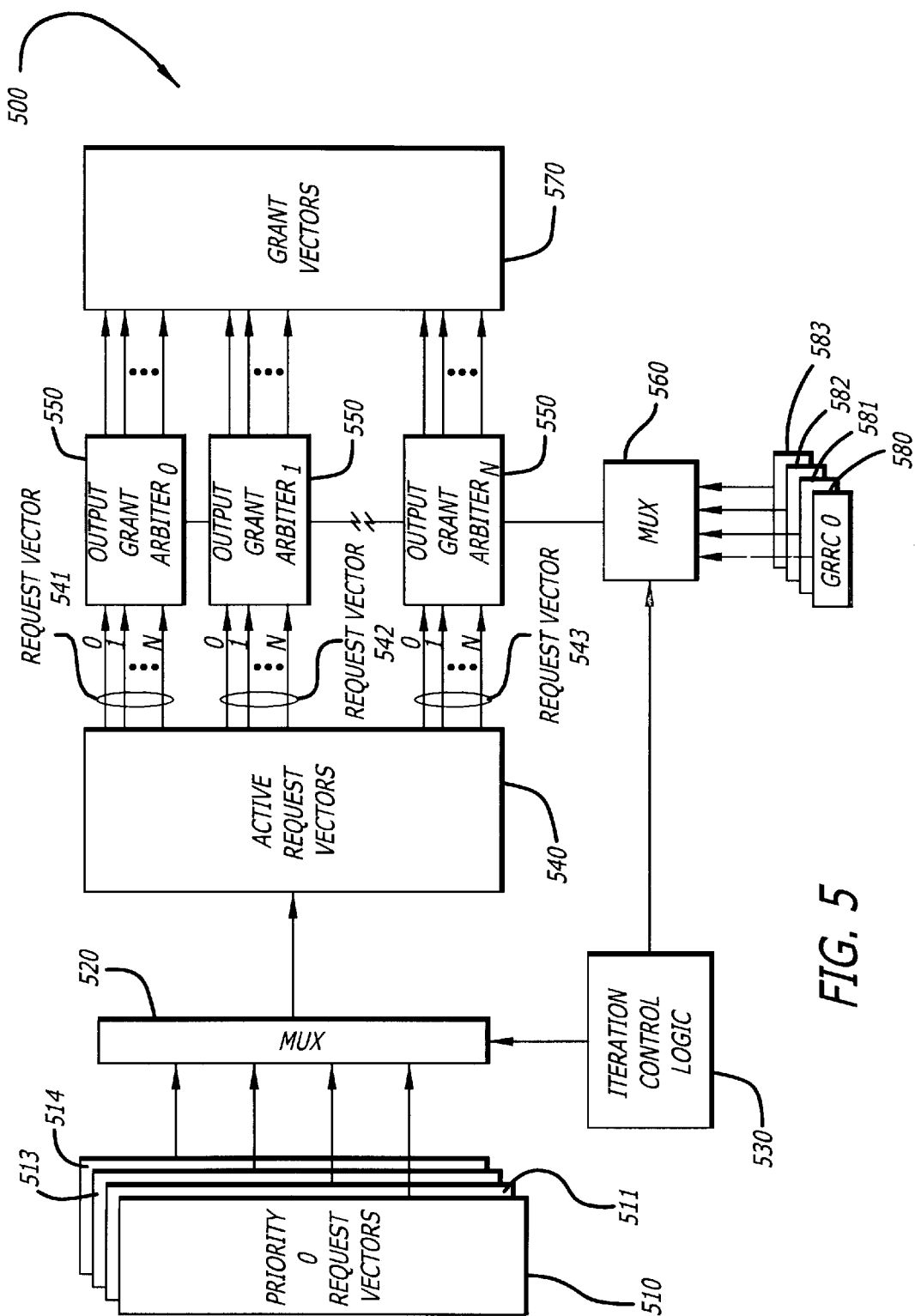
FIG. 5 is a high level block diagram of a hardware implementation of a multicast scheduler according to one embodiment of the present invention.

FIG. 5 is a high level block diagram of a hardware implementation of a multicast scheduler according to one embodiment of the present invention. According to this embodiment, the multicast scheduler 500 consists of a set of priority request vector registers for each class of service 510–513, a multiplexer (MUX) 520, iteration control logic 530, a set of active request vector registers 540, a set of output grant arbiters 550, a set of priority indicators, e.g., GRRCs 580–583, a MUX 560, and a set of grant vector registers 570.

During a multicast scheduling cycle, iteration control logic 530 causes an arbitration iteration to be performed for each class of service. The priority request vector registers 510–513 are coupled to the input of MUX 520. Iteration control logic 530 is coupled to MUX 520 to select the set of priority request vectors for the current iteration. The output of MUX 520 is coupled to the set of active request vector registers 540. As a result, the priority request vectors selected for the current iteration are passed to the active request vector registers 540. Iteration control logic 530 is also coupled to MUX 560 to select the GRRC appropriate for the current iteration. The GRRCs 580–583 are coupled to the input of MUX 560 and the output of MUX 560 is coupled to each of the output grant arbiters 55, thereby programming each output grant arbiter 550 with the selected GRRC.

The active request vector registers 540 are coupled to the output grant arbiters 550. Each of the output grant arbiters 550 are presented with priorities and a request vector from the active request vector registers 540. For example, output grant arbiter 0 receives request vector 541 which indicates which of the input ports have a request for output port 0 and identifies the priorities associated with each of the requests. Similarly, output grant arbiters 1 and N receive request vectors 542 and 543, respectively and the associated priorities.

Each output grant arbiter 550 looks at the inputs associated with the class of service selected for the current iteration and selects one request on behalf of the corresponding output port. According to one embodiment, the output grant arbiters 550 select the request closest in priority to the GRRC in a circular fashion. A vector identifying the selected and non-selected input ports is then stored in the grant vector registers 570. Once an output grant arbiter 550 has matched an input port to its corresponding output port, it is disabled in all further iterations of the multicast scheduling cycle in order to prevent the output grant arbiter 550 from making additional matches.

Unicast Scheduling

Figure 6:
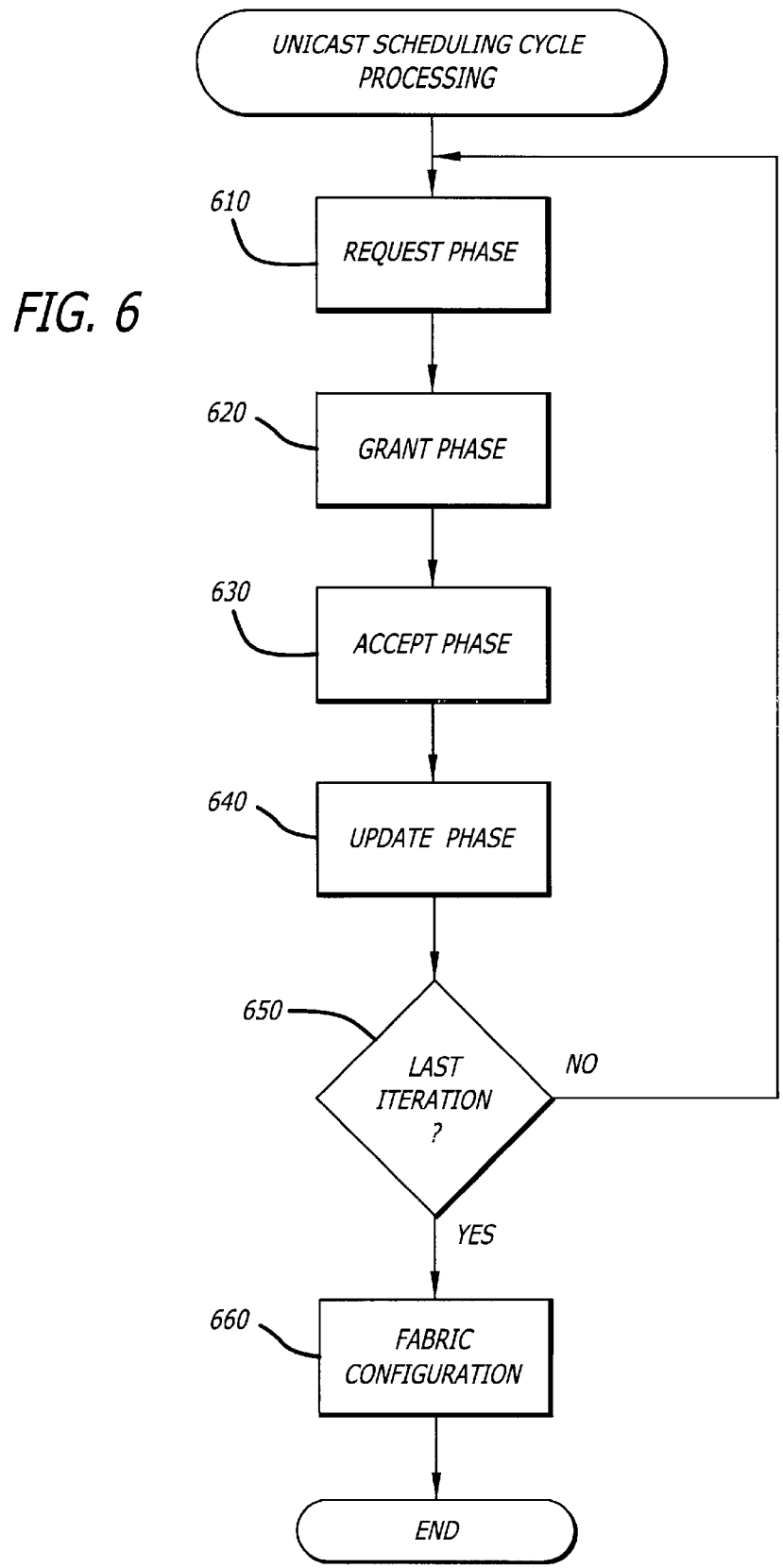
FIG. 6 is a flow diagram illustrating unicast scheduling processing according to one embodiment of the present invention.

Having described an exemplary hardware implementation of a multicast scheduler and exemplary multicast scheduling processing, unicast scheduling cycle processing will now be described with reference to the flow diagram of FIG. 6.

Briefly, in the embodiment illustrated, in a manner similar to multicast scheduling cycle processing, the unicast scheduling cycle processing is conceptually divided into four phases: a request phase, a grant phase, an accept phase, and an update phase. The four phases may be repeated for multiple iterations until no further port matchings can be established or until the time allocated to unicast scheduling has expired. Each iteration seeks to identify one or more port matchings that were not made in earlier iterations. The unicast algorithm is similar to the multicast algorithm, but it is more complicated due to the fact that there can be contention among two or more queues on the input side. For example, as with multicast, an input may receive grants from multiple outputs. However, in the unicast case, an input can be paired with only one output and can therefore accept only one of the grants received.

As above, at the beginning of each scheduling cycle, all input ports and output ports are initially unmatched (an exception will be noted below with regard to the novel combination of multicast and unicast scheduling). Only those that remain unmatched at the end of an iteration are available for matching in the next iteration. The unicast scheduling cycle begins at step 610 by performing the request phase. During the request phase, each of the input ports 107 communicates a transmit request 235 to the fabric configuration manager 110 indicating the output ports 109 to which cells at the head of its VOQs are destined. Based upon the transmit requests 235, request vectors are formed for each output port 109 that identify those of the input ports 107 with requests for the output port 109.

At step 620, the grant phase is performed. According to one embodiment, in order to ensure that each of the input ports 107 is provided with fair access to the output ports 109, a per output port priority indicator is maintained for each class of service. The priority indicator identifies which of the input ports receives top priority to the output port for the current scheduling iteration. In one embodiment, the priority indicators are modulo N counters, referred to as output round robin counters (ORRCs), where N represents the number of ports. In any event, during the grant phase, the unicast scheduler 220 evaluates the request vectors for each output port in a parallel fashion. If the output port is available for matching with an input port, then the request vectors for each class of service are evaluated to determine to which input port a grant will be made. The evaluation begins with the input port pointed to by the corresponding ORRC and proceeds in a circular fashion until an available input port is found that has a request for the output port. Importantly, because each class of service is independent, the operations for each class of service may be performed in parallel. However, if two input ports are selected for matching with an output port, then the input port selected from the request vector corresponding to the higher priority class of service receives the grant over the input port selected from the request vector corresponding to the lower priority class of service. At any rate, based upon the results of the evaluation of the request vectors, grants are made to the selected inputs forming a grant vector for each input port indicating the output ports 109 that have granted a request from the input port 107.

At step 630, the accept phase is performed. Since two or more VOQs may have a head of line cell pending for different output ports 109, input ports 107 may receive grants from multiple output ports 109. During the accept phase, the unicast scheduler 220 evaluates the grant vectors for each input port that is available for matching with an output port (in parallel) and accepts only one grant per available input port. According to one embodiment, a per input port priority indicator is maintained for each class of service. The priority indicator identifies which of the output ports that is given top priority by the input port for the current scheduling iteration. In one embodiment, the priority indicators are modulo N counters, referred to as input round robin counters (IRRCs), where N represents the number of ports. In any event, in order to accomplish the evaluation of a grant vector, the unicast scheduler 220 begins with the output port pointed to by the corresponding IRRC and proceeds in a circular fashion until an available output port is found that has issued a grant to the input port. As above, because each class of service is independent, the operations for each class of service may be performed in parallel. Should more than one output port be selected for matching with an input port, then the output port selected from the grant vector corresponding to the higher priority class of service is accepted. Based upon the results of the evaluation of the grant vectors, accepts are made to the selected outputs. Finally, those of the input ports 107 and output ports 109 that were matched during the current iteration (as determined by the accepts) should be marked as unavailable. In this manner, the matched ports are removed from further consideration in subsequent iterations of the scheduling cycle.

At step 640, the update phase is performed. The update phase includes updating the request vectors for use in the next iteration and updating the priority indicators, e.g., the ORRC values and the IRRC values. In one embodiment, the request vectors may be modified based upon the accepts such that no requests will be presented in subsequent iterations from an input port that has accepted an output port and/or such that no requests will be presented to an output port that has been accepted by an input port. With regard to update of the priority indicators, an ORRC is incremented if either the input port to which it points has been serviced by the corresponding output port (e.g., the output port has issued a grant to the input port which has been accepted for the corresponding class of service) or the input port requires no service from the output port (e.g., the input port has no unicast cells pending for the corresponding output port at the corresponding class of service). Similarly, an IRRC is incremented if either the output port to which it points has been serviced by the corresponding input port (e.g., the input port has accepted a grant to the output port for the corresponding class of service) or the output port requires no service from the input port (e.g., the output port has issued no grant to the corresponding input port for the corresponding class of service). Importantly, the priority indicators are updated only after the first iteration of a scheduling cycle.

Before discussing the update mechanism further, it may be useful to describe the overall functioning of the ORRCs and the IRRCs. The ORRCs and the IRRCs are tools that ensure that the unicast scheduling algorithm works in a fair manner and that the delays seen by all the input ports are finitely bounded. Each scheduling cycle, the ORRC for a particular output port steps through the request vector for the output port until it encounters a request (e.g., the bit it is pointing to is set indicating the corresponding input port has issued a request to the output port). The ORRC remains at this value until the request is serviced. This behavior ensures that the output port will always send a grant to this input port at every opportunity. Similarly, the IRRC for a particular input port steps through the corresponding grant vector until it encounters a grant (e.g., the bit it is pointing to is set indicating the corresponding output port has given a grant to the input port). The IRRC remains at this value until this grant is accepted. This behavior ensures that the input port will always accept the grant from this output port at every opportunity. Without such a gating mechanism, there is no guarantee that a cell will be transmitted. For example, if an ORRC was allowed to move ahead of a request without servicing it or if an IRRC was allowed to move ahead of a grant without servicing it, then the possibility exists that the corresponding cell might never be transmitted.

Returning to the updating of the ORRC and IRRC values, as was mentioned above, they are incremented only after the first iteration of a scheduling cycle. Additionally, the priority indicators may be updated differently depending upon the circumstances. For example, when a port to which a priority indicator points does not need service, the priority indicator is simply incremented by one (modulo N). However, when a port to which a priority indicator points needs service, the priority indicator is only updated after that port has been serviced; otherwise the priority indicator is not updated. The ORRC and IRRC values are incremented beyond a port that has just been serviced. For each IRRC, if the corresponding input port has accepted an output port for the corresponding class of service, then the IRRC is incremented to point to the output port after the one accepted. That is, the IRRC is set to one plus the value of the output port accepted (modulo N). Similarly, for each ORRC, if the corresponding output port has been accepted by an input port for the corresponding class of service, then the ORRC is set to one plus the value of the input port that has accepted the output port (modulo N). In this manner, connections made in the first iteration are the lowest priority during the next scheduling cycle and no connections are starved.

At step 650, it is determined if this is the last iteration of the scheduling cycle. For example, a predetermined number of iterations may be performed or the iterations may continue so long as at least one port matching was made during the previous iteration. In any event, the number of iterations need not exceed the number of input ports, N, since only one connection can be made for each input port. If this is not the last iteration of the scheduling cycle, processing continues with step 610. Otherwise, the unicast scheduling cycle is complete and fabric configuration may commence at step 660.

At step 660, fabric configuration is performed. The fabric 120 is configured one time for each unicast scheduling cycle after the current schedule, e.g., the port matchings, has been established. Based upon the state of the accept signals at the conclusion of the unicast scheduling cycle, the unicast scheduler 220 presents a fabric configuration 260 to the fabric 120. The fabric configuration 260 activates the fabric 120 and directs the fabric 120 to form connections among the fabric interfaces 115 that will accommodate the transfer of cells across the fabric 120 according to the current schedule.

Figure 7A:
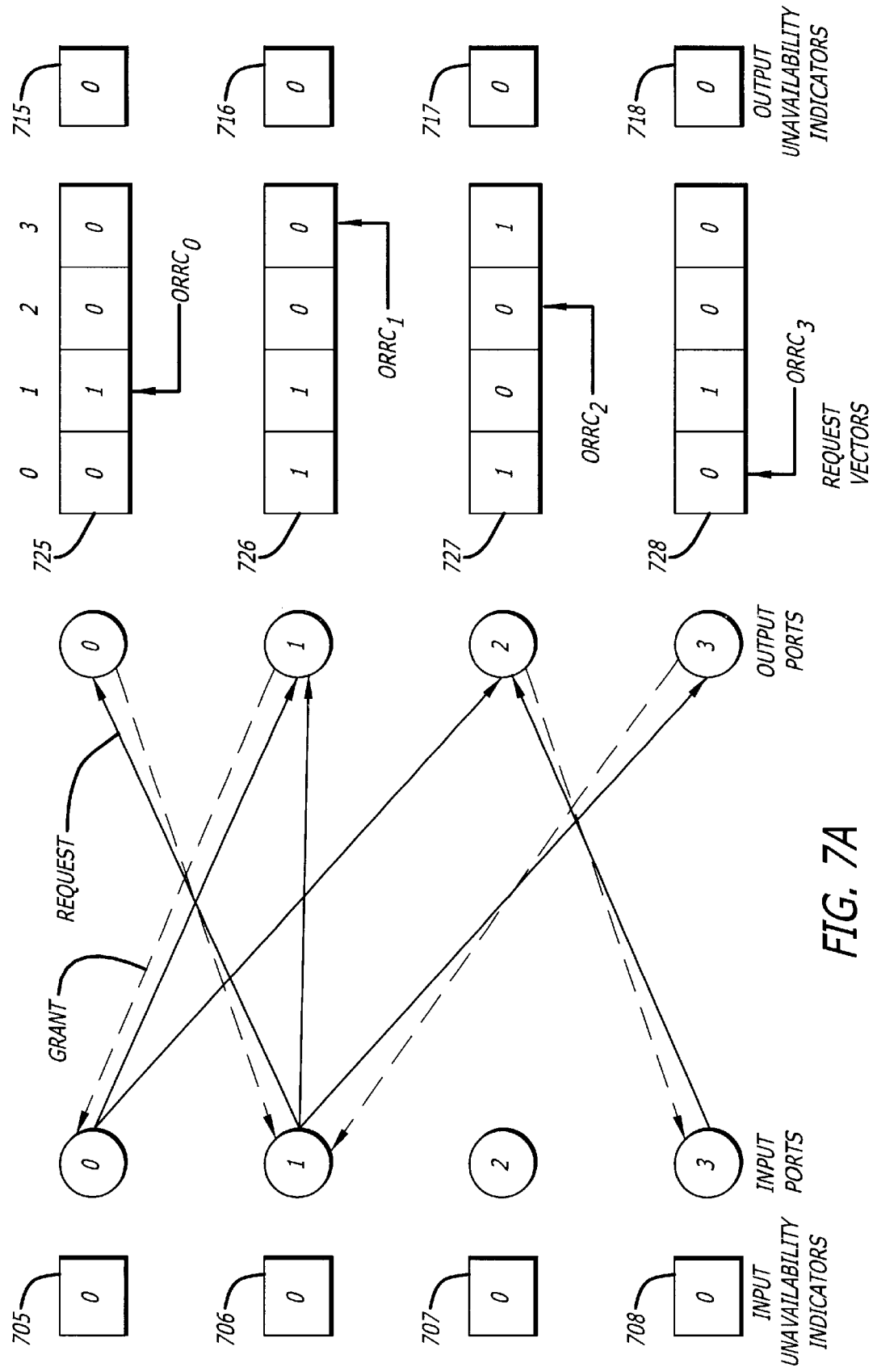
FIGS. 7A and 7B conceptually illustrate a unicast scheduling cycle according to one embodiment of the present invention.
Figure 7B:
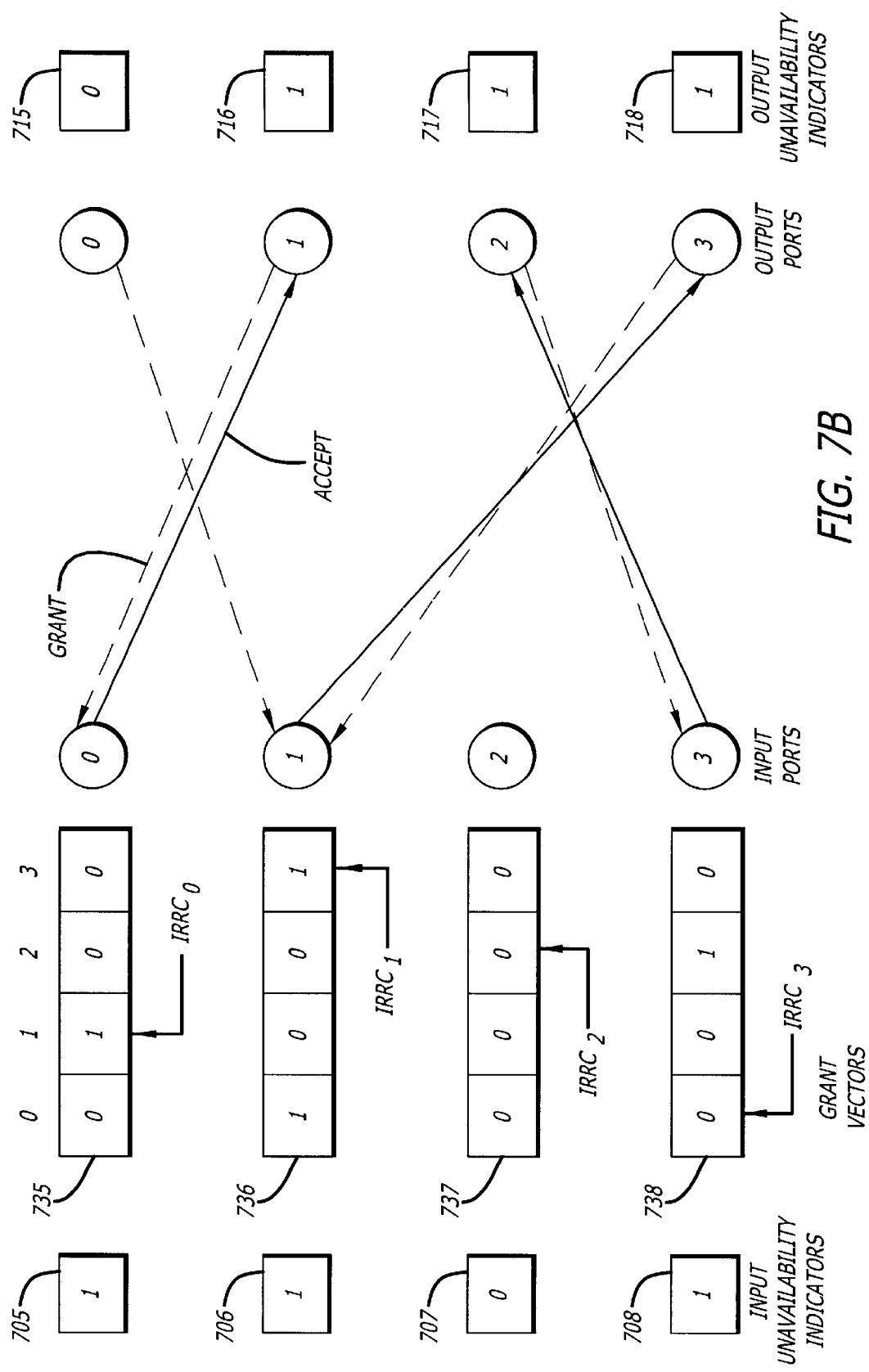

Referring to FIGS. 7A and 7B, one iteration of an exemplary unicast scheduling cycle will now be described. Beginning with FIG. 7A, communication of transmit request information is depicted as a solid line from an input port to an output port and grants are depicted as dotted lines from output ports to input ports. For purposes of this example, four input ports numbered 0 to 3 and four output ports numbered 0 to 3 are depicted. The input ports each have a corresponding unavailability indicator 705–708. Similarly, each output port has a corresponding unavailability indicator 715–718. In this example, the output ports each have a corresponding priority indicator, ORRC 0–3, shown pointing to input ports 1, 3, 2, and 0, respectively. Therefore, during this scheduling cycle, input port 1 receives priority over any other input ports contending for output port 0, input port 3 receives priority over any other input ports contending for output port 1, input port 2 receives priority over any other input ports contending for output port 2, and input port 0 receives priority over any other input ports contending for output port 3.

In this example, input port 0 has two unicast cells ready for transfer across the fabric 120. One is destined for output port 1 and the other is destined for output port 2. Three head-of-line unicast cells at input port 1 are destined for output ports 0, 1 and 3. No unicast cells are pending at input port 2. Finally, input port 3 has one unicast cell that is ready to be transferred to output port 2. While control information is typically communicated from the input ports 107 to the fabric configuration manager 110, for purposes of this example, the communication is conceptually represented as being communicated between input ports 0–3 and output ports 0–3. At any rate, during the request phase (step 610) the input ports each communicate their transmit request information to the output ports.

The transmit request information accumulated at output port 0 forms request vector 725. Similarly, request vectors 726–728 are formed at output ports 1–3, respectively. The request vectors 725–728 have a bit position corresponding to each of the input ports 0–3. Again, a bit is set in the request vectors 735–728 when the corresponding input port has a unicast cell ready for delivery to the output port. The bit remains clear if the corresponding input port has no unicast cells destined for the output port.

During the grant phase (step 620), each output port that is available searches its corresponding request vector 725–728, respectively, in a circular fashion beginning with the input port identified by the associated ORRC 0–3 to select the first available input port that has a request for that output port. In this example, the first available input port that has a request for output port 0 is input port 1. Input port 0 is the first available input port that has a request for output port 1. Output port 2 selects input port 3 and output port 3 selects input port 1. After the output ports have selected an input port, grants are issued to those of the input ports that have been selected. In this example, therefore, grants are issued from output port 0 to input port 1, from output port 1 to input port 0, from output port 2 to input port 3, and from output port 3 to input port 1.

Turning now to FIG. 7B, continuing with the present example, a grant is depicted as a dotted line from an output port to an input port and accepts are depicted as solid lines from input ports to output ports. For purposes of arbitrating among multiple grants, each input port has a corresponding priority indicator, IRRC 0–3, shown pointing to output ports 1, 3, 2, and 0, respectively. Therefore, during this scheduling cycle, output port 1 receives priority over any other output ports contending for input port 0, output port 3 receives priority over any other output ports contending for input port 1, output port 2 receives priority over any other output ports contending for input port 2, and output port 0 receives priority over any other output ports contending for input port 3.

During the accept phase (step 630), each input port that is available searches its corresponding grant vector 735–738, respectively, in a circular fashion beginning with the output port identified by the associated IRRC 0–3 to select the first available output port that has a grant for that input port. In this example, the first available output port that has a grant for input port 0 is output port 1. Output port 3 is the first available output port that has a request for input port 1. Input port 2 has received no grants and input port 3 selects output port 2. After the input ports have selected an output port, accepts are issued to those of the output ports that have been selected. In this example, therefore, accepts are issued from input port 0 to output port 1, from input port 1 to output port 3, and from input port 3 to input port 2. Finally, those of the input ports and output ports that were matched (e.g., those of input ports issuing accepts and those of the output ports receiving accepts) are marked as unavailable. In this example, therefore, input ports 0, 1, and 3 and output ports 1–3 are marked as unavailable by setting input unavailability indicators 705, 706, and 708 and output unavailability indicators 716–718, respectively, thereby removing these ports from consideration in subsequent iterations of the scheduling cycle.

During the update phase (step 640), the IRRCs and the ORRCs are updated in accordance with the update mechanism described above. In this example, the value of $ORRC_0$ will remain unchanged since a request from the input port to which it points remains unserved. The value of $ORRC_1$, will be updated to one since the request from input port 0 was serviced. The value of $ORRC_2$ will be updated to zero since the request from input port 3 was serviced. The value of $ORRC_3$ will be updated to two since the request from input port 1 was serviced. Meanwhile, on the input side, the value of $IRRC_0$ will be updated to two, the value of $IRRC_1$, will be updated to zero, and the values of both $IRRC_2$ and $IRRC_3$ will be updated to three.

Assuming the fabric 120 were configured according to this exemplary scheduling cycle iteration, the fabric configuration would cause a unicast cell to be transferred from input ports 0, 1, and 3 to output ports 1, 3, and 2, respectively.

Figure 8:
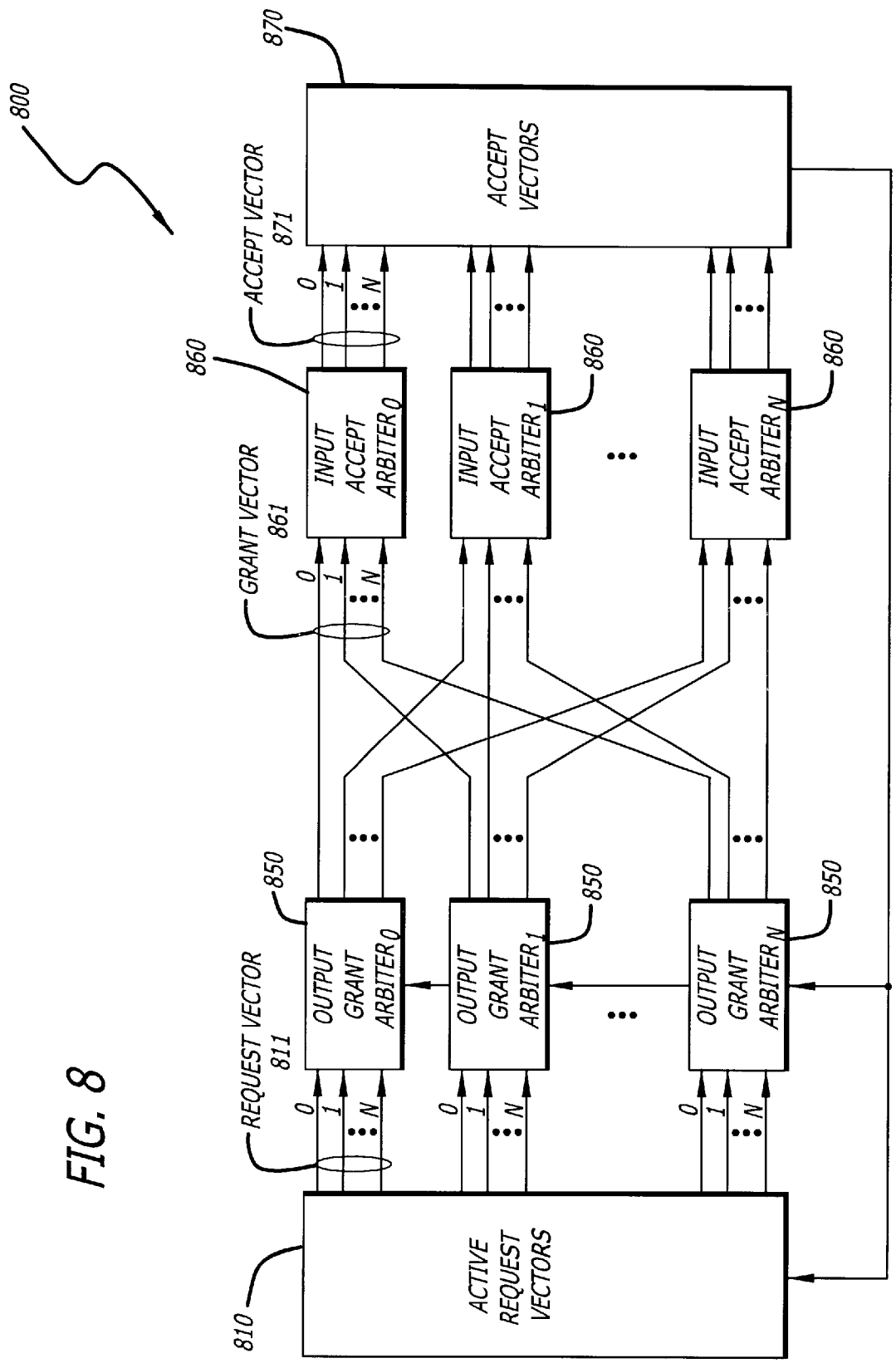
FIG. 8 is a high level block diagram of a hardware implementation of a unicast scheduler according to one embodiment of the present invention.

FIG. 8 is a high level block diagram of a hardware implementation of a unicast scheduler according to one embodiment of the present invention. For purposes of simplifying the discussion, this example addresses the case of a unicast scheduler 800 that supports a single class of service. According to this embodiment, the unicast scheduler 800 consists of a set of active request vector registers 810, a set of output grant arbiters 850, a set of input accept arbiters 860, and a set of accept vector registers 870.

The active request vector registers 810 are coupled to the output grant arbiters 850. The output grant arbiters 850 choose among contenting requests on behalf of the corresponding output port 109. At the beginning of each unicast scheduling cycle, transmit requests 235 from the input ports 107 are loaded into the active request vector registers 810. Each iteration of the scheduling cycle, N-bit request vectors 811 are presented to each of the N corresponding output grant arbiters 850.

Each of the output grant arbiters 850 are coupled to each of the input accept arbiters 860. The output grant arbiters 850 each select one of the competing requests that is closest in priority to its ORRC and issue a grant signal to the input accept arbiter 860 corresponding to the selected request.

The input accept arbiters 860 are coupled to the set of accept vector registers 870 to identify the output port that has been matched with the corresponding input port. The input grant arbiters 860 each select one of the competing grants received from the output grant arbiters 850 that is closest in priority to its IRRC and issue an accept signal corresponding to the selected output port. The input accept arbiters 860 present accept signals in the form of an accept vector 871 to the set of accept vector registers 870. Each iteration, feedback from the accept vector registers 870 may be used to mask off requests corresponding to ports that have already been matched during the scheduling cycle. Alternatively, once a port has been matched, the corresponding arbiter 850 or 860 may be disabled in all further iterations of the scheduling cycle to prevent the arbiter from making additional matches. At any rate, the accept signals are accumulated in the set of accept vector registers 870 during each iteration of the unicast scheduling cycle and, as discussed above, are used at the end of the unicast scheduling cycle to configure the fabric 120.

Exemplary Round-Robin Arbiters

Figure 9A:
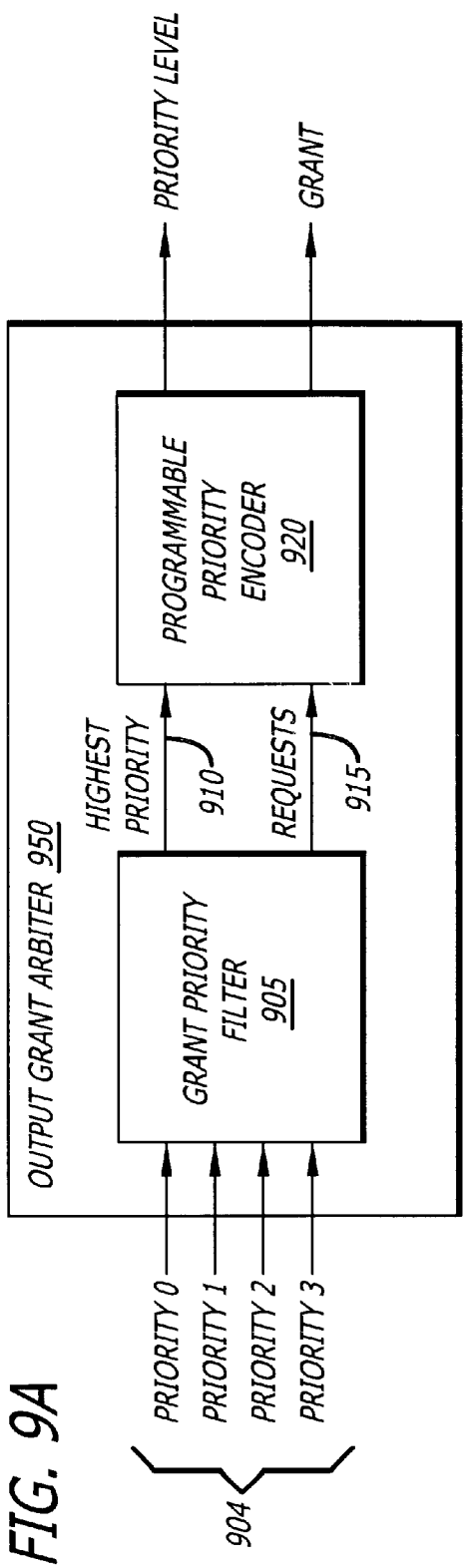
FIGS. 9A and 9B depict exemplary round-robin arbiters that may be used in accordance with one embodiment of the present invention.
Figure 9B:
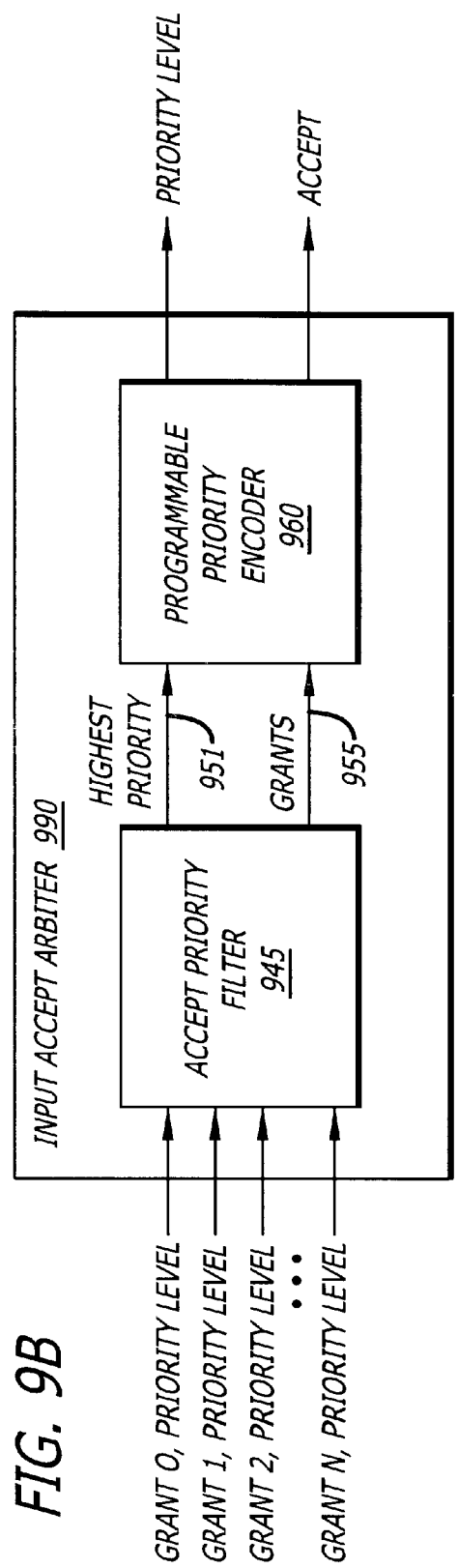

FIGS. 9A and 9B depict exemplary round-robin arbiters that may be used in accordance with one embodiment of the present invention. Referring first to FIG. 9A, an output grant arbiter 950 that understands four classes of service is illustrated. In this example, the output grant arbiter 950 includes a grant priority filter 905 and a programmable priority encoder 920. A plurality of request vectors 904 associated with one or more priority levels are received by the grant priority filter 905. The grant priority filter 905 selects the request vector associated with the highest priority class of service and allows those requests 915 to be presented to the programmable priority encoder 920. As is well known, programmable priority encoders select as an output one of its inputs as determined by a supplied priority indication. In this example, the programmable priority encoder 920 grants one of the requests 915 based upon the highest priority 910, e.g., an ORRC, supplied by the grant priority filter 905. The priority levels and the grants produced by N output grant arbiters 950 are presented to an input accept arbiter 990 such as that illustrated in FIG. 9B. In this example, the input accept arbiter 990 includes an accept priority filter 945 and a programmable priority encoder 960. The accept priority filter 945 outputs the grants 955 associated with the highest priority class of service level. The programmable priority encoder 960 accepts one of the grants 955 based upon the highest priority 951, e.g., an IRRC, supplied by the accept priority filter 945.

In one embodiment, the unicast scheduler 220 may include N output grant arbiters 950 and N input accept arbiters 990. Importantly, however, the present invention is not limited to any particular round-robin arbiter, the multicast scheduler 215 and unicast scheduler 220 may employ various other types of round-robin arbiters. For example, one of the fast programmable priority encoders described in P. Gupta and N. McKeown, "Design and Implementation of a Fast Crossbar Scheduler," Hot Interconnects VI, Stanford University, August 1998, which is hereby incorporated by reference, may be used.

Combined Multicast and Unicast Schedulinq

According to one embodiment of the present invention, a novel scheduling approach permits unicast scheduling processing and multicast scheduling processing to operate in parallel and independently resulting in a combined schedule comprising both unicast and multicast cells. Parallelism may be achieved, for example, by pipeline staging of unicast and multicast scheduling. Pipelining unicast and multicast scheduling is advantageous, for example, if the duration of the cell scheduling cycle is insufficient to accommodate both unicast and multicast scheduling in serial. Prior scheduling approaches produce uniform schedules that are limited to either all unicast cells or all multicast cells. In contrast, the novel combined scheduling approach permits a combined schedule to be produced comprising both unicast and multicast cells. In this manner, both multicast and unicast cells may be transferred across the fabric 120 during the same time slot. Additionally, the separation of unicast and multicast scheduling results in increased flexibility and programmability of the rate at which unicast and/or multicast traffic is serviced.

Figure 10A:
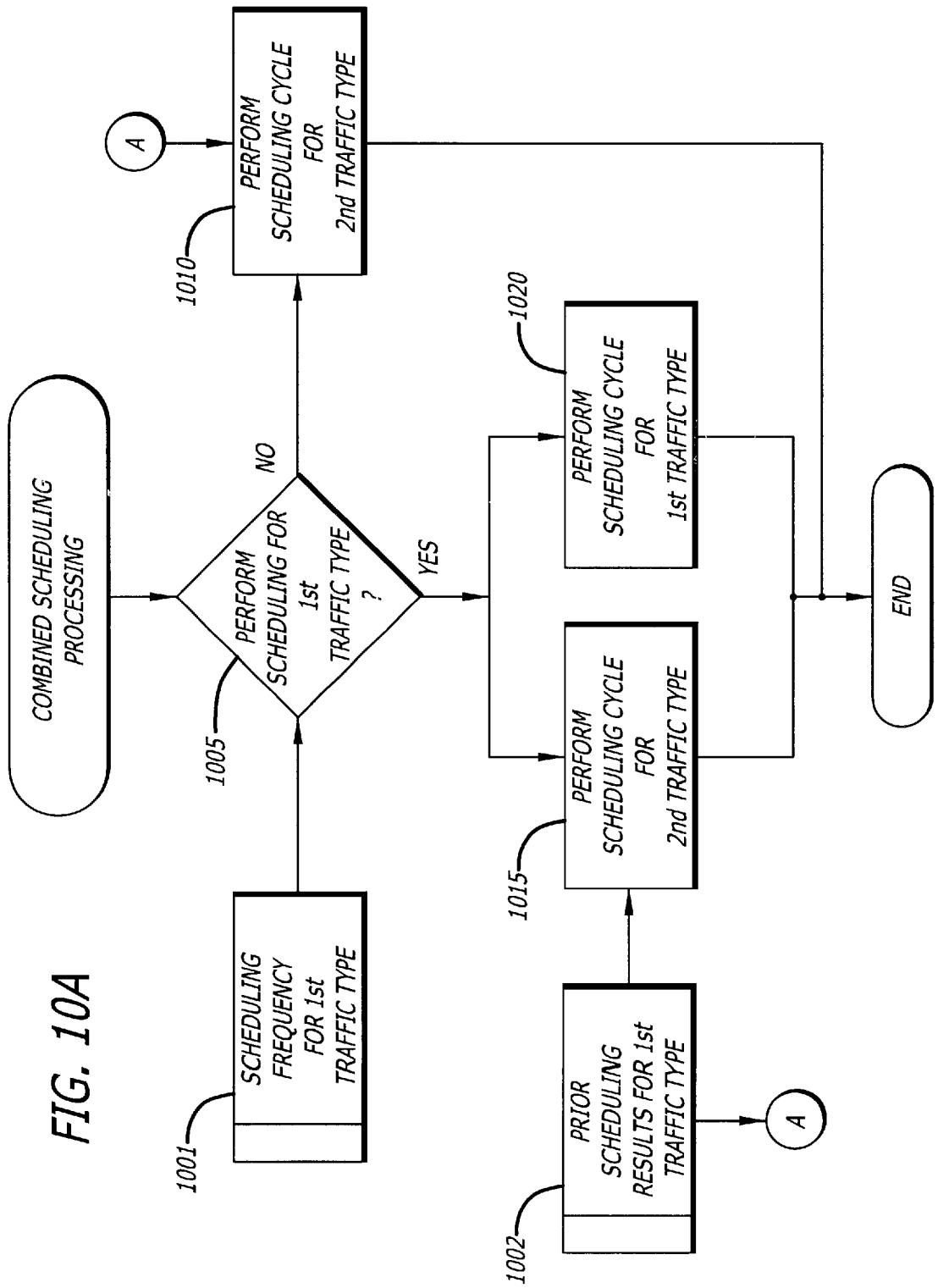
FIG. 10A is a flow diagram illustrating combined scheduling processing for two types of traffic according to one embodiment of the present invention.

Referring now to FIG. 10A, a general flow diagram is described illustrating combined scheduling processing for two different types of traffic according to one embodiment of the present invention. This example assumes cell scheduling processing is performed once each time slot, cell scheduling for one of the types of traffic, i.e., the first traffic type, is performed less than every time slot, cell scheduling for the other type of traffic, i.e., the second traffic type is performed every time slot, cells of the first traffic type are scheduled at least one time slot in advance of their transfer across the fabric 120, cells of the second traffic type are scheduled and transferred in the same time slot, and when both cells of the first and second traffic type.

According to this example, at step 1005, a determination is made whether or not to perform scheduling for the first type of traffic based upon a predetermined scheduling frequency 1001. The scheduling frequency 1001 may be a hardcoded value or a programmable parameter as will be discussed further below. At any rate, if cell scheduling is to be performed for the first type of traffic during the current time slot, then processing continues with steps 1015 and 1020. Steps 1015 and 1020 are preferably performed by separate and independent cell scheduling units, as discussed above, thereby providing the ability to perform the cell scheduling for the two types of traffic in parallel. At step 1020, a cell scheduling cycle for the first type of traffic is performed and the results are stored for a subsequent time slot. Concurrently, in step 1015 a cell scheduling cycle for the second type of traffic is performed for the current time slot. During time slots in which both the cells of the first and second type of traffic are to be transferred, the prior scheduling results for the first type of traffic 1002 are fed into the scheduling processing for the second type of traffic (step 1015) and the scheduler schedules cells of the second type of traffic whose ports are not being used by the previously scheduled cells of the first type of traffic. When both scheduling cycles have been finalized, the combined scheduling processing is complete.

Returning to step 1005, if cell scheduling is not to be performed for the first type of traffic during the current time slot, then processing continues with step 1010. In step 1010, a cell scheduling cycle for the second type of traffic is performed for the current time slot. As above, during time slots in which both the cells of the first and second type of traffic are to be transferred, the prior scheduling results for the first type of traffic 1002 are fed into the scheduling processing for the second type of traffic (step 1010) and the scheduler schedules cells of the second type of traffic whose ports are not being used by the previously scheduled cells of the first type of traffic. When the scheduling cycle has been finalized, the combined scheduling processing is complete.

In alternative embodiments, if the duration of the time slot is greater than or equal to the time required to perform both scheduling cycles without overlap, then the cell scheduling cycles may be performed serially. Additionally, in alternative embodiments, scheduling frequencies may be supplied for both the first type and the second type of traffic.

Figure 10B:
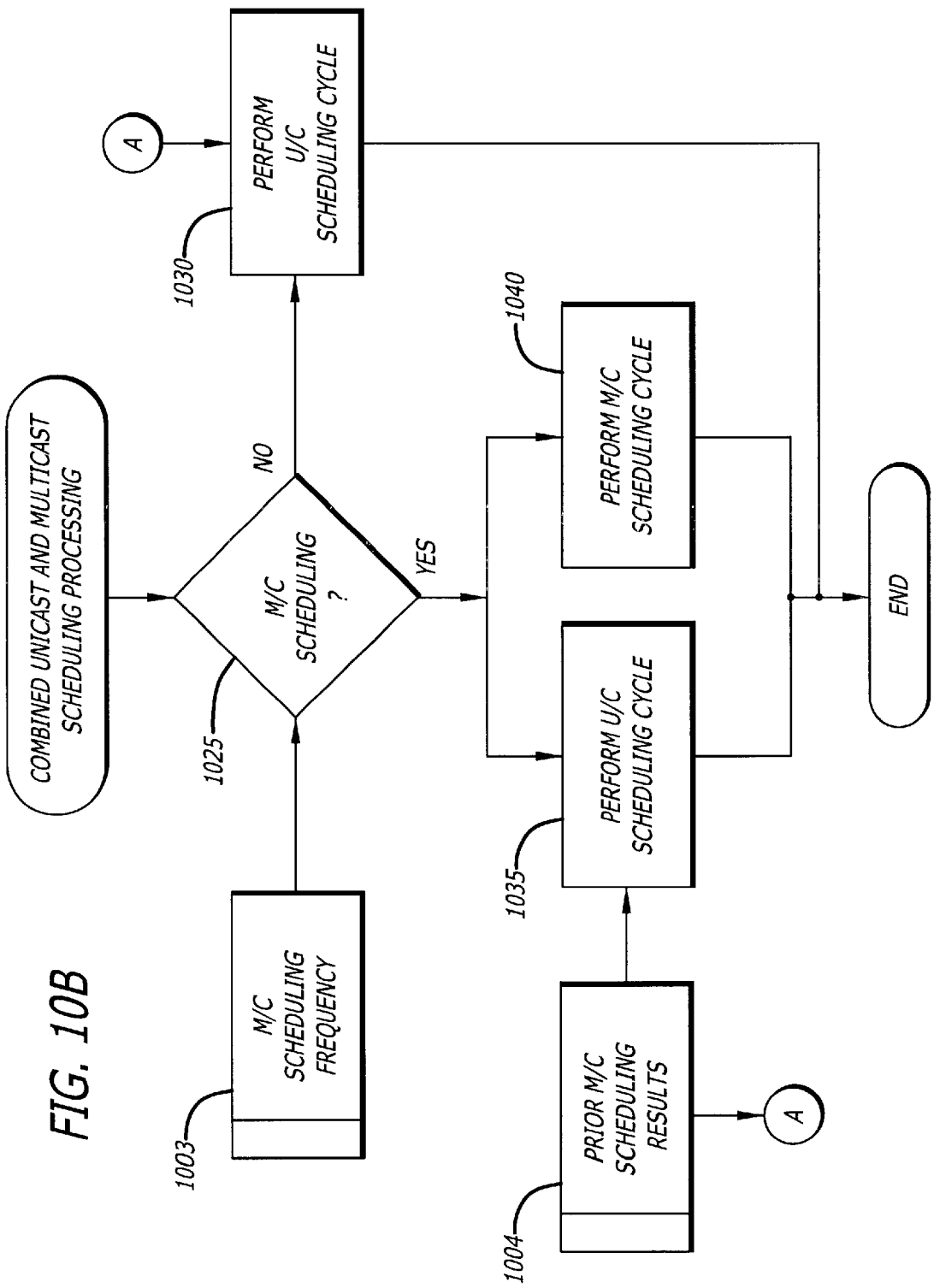
FIG. 10B is a flow diagram illustrating combined unicast and multicast scheduling processing according to one embodiment of the present invention.

FIG. 10B is a flow diagram illustrating an embodiment of FIG. 10A in which unicast and multicast scheduling may be combined. In the embodiment depicted, multicast and unicast cell scheduling operate separately and independently, however during selected time slots when both multicast traffic and unicast traffic are scheduled for transfer across the fabric 120, unicast cells are scheduled based upon the results of an earlier multicast scheduling cycle. For example, unicast cells may be scheduled at a lower priority than the multicast cells by limiting the ports available to the unicast scheduler 220 to those ports that are left unmatched by the earlier multicast scheduling cycle.

At step 1025, a determination is made whether or not to perform multicast scheduling based upon a predetermined multicast scheduling frequency 1003. If multicast scheduling is to be performed during the current time slot, then processing continues with steps 1035 and 1040. Steps 1035 and 1040 are preferably performed by separate and independent schedulers, such as unicast scheduler 220 and multicast scheduler 215 discussed above, thereby providing the ability to perform the multicast and unicast scheduling in parallel. At step 1040, a multicast scheduling cycle is performed and the results are stored for a subsequent time slot. Concurrently, in step 1035 a unicast scheduling cycle is performed for the current time slot. If both unicast and multicast cells are to be transferred during the current time slot, then the prior multicast scheduling results 1004 are input into the unicast scheduling processing (step 1035) and the unicast scheduler 220 schedules unicast cells whose ports are not being used by the previously scheduled multicast cells. When both scheduling cycles have been finalized, the combined scheduling processing is complete.

Returning to step 1025, if multicast scheduling is not to be performed during the current time slot, then processing continues with step 1030. In step 1030, a unicast scheduling cycle is performed for the current time slot. Again, if both unicast and multicast cells are to be transferred during the current time slot, then the prior multicast scheduling results 1004 are input into the unicast scheduling processing (step 1030) and the unicast scheduler 220 schedules unicast cells whose ports are not being used by the previously scheduled multicast cells. When the scheduling cycle has been finalized, the combined scheduling processing is complete.

Figure 10C:
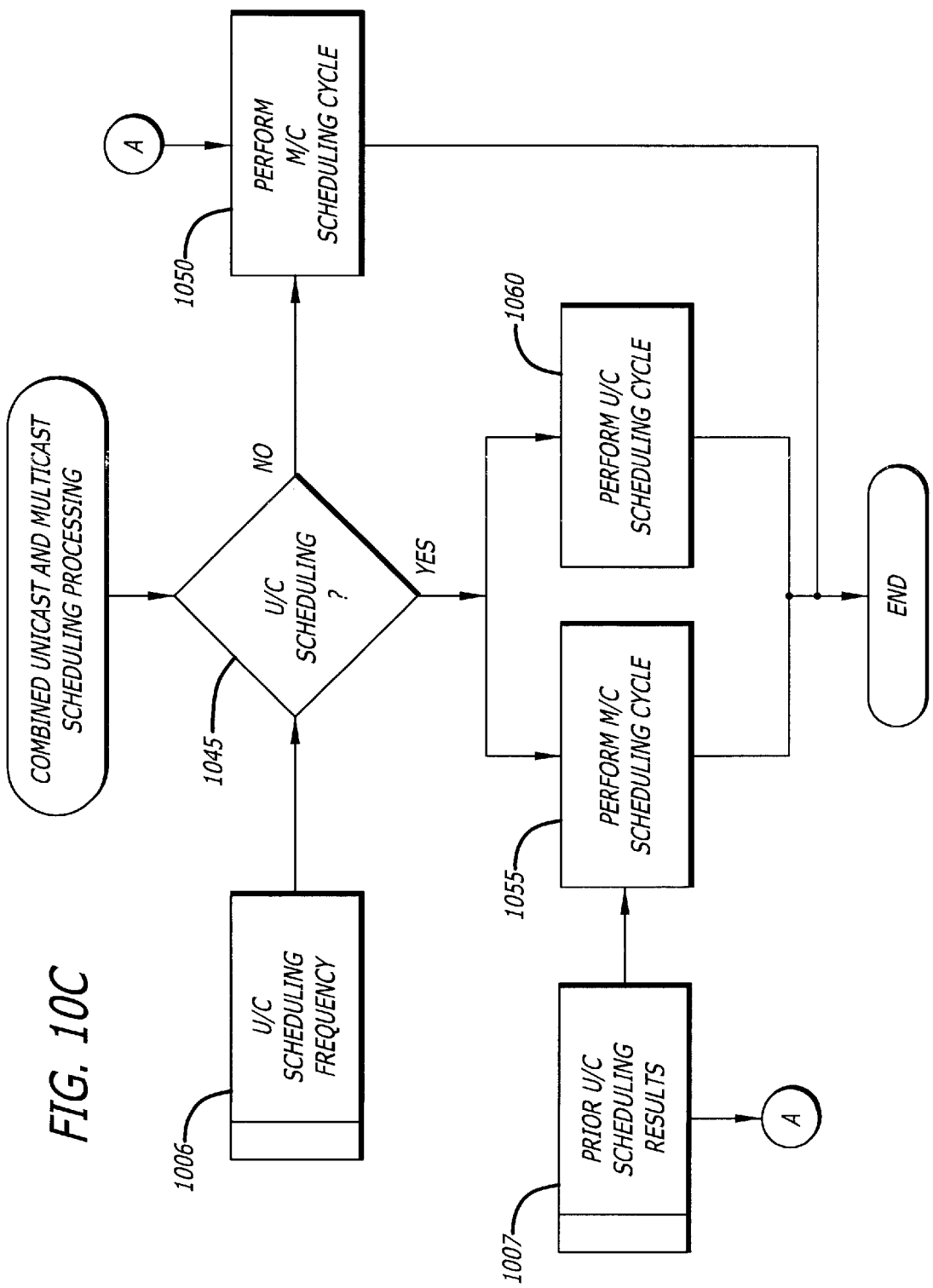
FIG. 10C is a flow diagram illustrating combined unicast and multicast scheduling processing according to another embodiment of the present invention.

FIG. 10C is a flow diagram illustrating another embodiment of FIG. 10A in which unicast and multicast scheduling may be combined. In this embodiment, multicast and unicast cell scheduling operate separately and independently as above, however when both multicast traffic and unicast traffic are scheduled for transfer across the fabric 120, multicast cells are scheduled based upon the results of an earlier unicast scheduling cycle. For example, multicast cells may be scheduled at a lower priority than the unicast cells by limiting the ports available to the multicast scheduler 215 to those ports left unmatched by the earlier multicast schedule.

At step 1045, a determination is made whether or not to perform unicast scheduling based upon a predetermined unicast scheduling frequency 1006. If unicast scheduling is to be performed during the current time slot, then processing continues with steps 1055 and 1060. Steps 1055 and 1060 are preferably performed by separate and independent schedulers, such as multicast scheduler 215 and unicast scheduler 220 discussed above, thereby providing the ability to perform the multicast and unicast scheduling in parallel. At step 1060, a unicast scheduling cycle is performed and the results are stored for a subsequent time slot. Concurrently, in step 1055 a multicast scheduling cycle is performed for the current time slot. If both unicast and multicast cells are to be transferred during the current time slot, then the prior unicast scheduling results 1007 are input into the multicast scheduling processing (step 1055) and the multicast scheduler 215 schedules multicast cells whose ports are not being used by the previously scheduled unicast cells. When both scheduling cycles have been finalized, the combined scheduling processing is complete.

Returning to step 1045, if unicast scheduling is not to be performed during the current time slot, then processing continues with step 1050. In step 1050, a multicast scheduling cycle is performed for the current time slot. Again, if both unicast and multicast cells are to be transferred during the current time slot, then the prior unicast scheduling results 1007 are input into the multicast scheduling processing (step 1050) and the multicast scheduler 215 schedules multicast cells whose ports are not being used by the previously scheduled unicast cells. When the scheduling cycle has been finalized, the combined scheduling processing is complete.

Pipelined Staging of Multicast and Unicast Scheduling

Figure 11A:
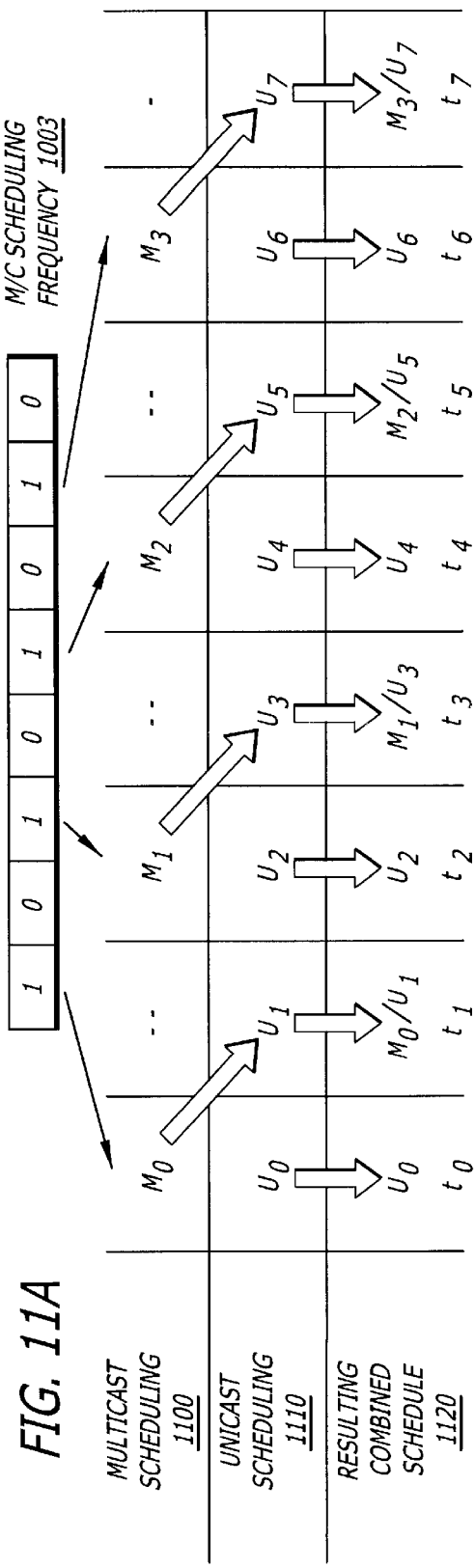
FIG. 11A conceptually illustrates a pipelined approach for scheduling multicast and unicast traffic according to one embodiment of the present invention.

FIG. 11A conceptually illustrates a pipelined approach for scheduling multicast and unicast traffic according to one embodiment of the present invention. Multicast scheduling 1100 is shown along the top row. Unicast scheduling 1110 is shown along the middle row. The bottom row indicates the resulting combined schedule 1120. The hollow arrows point in the direction of the time slot during which the resulting schedule is used. For example, multicast schedule $M_0$ is generated during time slot $t_0$, but is used during time slot $t_1$.

A multicast scheduling frequency register 1003 identifies those of the time slots, e.g., $t_0$–$t_7$, during which multicast scheduling 1100 is to be performed. Many possible implementations of the multicast scheduling frequency register 1003 have been contemplated. According to one embodiment, a circular register is implemented, where the bits of the register are set to '1' or '0' in accordance with whether the current time slot is a multicast time slot. Each time slot, the bits of the register are rotated and the LSB or the MSB can be evaluated. Alternatively, the multicast scheduling frequency register 1003 may be implemented as an up or a down circular counter. Each time slot, the counter is incremented or decremented and the value in the counter is compared to a predetermined value that indicates when multicast scheduling is to be performed. According to one embodiment, the multicast scheduling frequency register 1003 contains a hardcoded value. In alternative embodiments, however, the multicast scheduling frequency register 1003 is a programmable parameter thereby allowing the provision of variable rate multicast servicing and putting a cap on the total bandwidth available to multicast traffic. Responsive to historical network usage or scheduled network usage, the multicast scheduling frequency register 1003 may be adjusted upward or downward automatically by a traffic monitoring process, for example. Alternatively, bandwidth may be allocated between unicast and multicast traffic by the network administrator by tuning the multicast scheduling frequency.

In the example illustrated by FIG. 11A, if a bit position in the multicast scheduling frequency register 1003, contains a '1,' then multicast scheduling 1100 is performed during the corresponding time slot; otherwise no multicast scheduling is performed during the time slot. According to the embodiment depicted, unicast scheduling 1110 is performed every time slot. Assuming the duration of a time slot is insufficient to accommodate both unicast and multicast scheduling in serial, the novel combined scheduling approach described herein permits a combined schedule 1120 to be generated by employing a pipelined scheduling approach.

Briefly, in this example, multicast scheduling time slots occur as a subset of unicast scheduling time slots. Unicast scheduling 1110 occurs every time slot and multicast scheduling 1100 occurs every other time slot. During the first time slot, $t_0$, both multicast scheduling and unicast scheduling are performed in parallel. The multicast scheduling cycle produces a first multicast schedule, $M_0$, for the next time slot, $t_1$, and the unicast scheduling cycle produces a first unicast schedule, $U_0$, for the current time slot, $t_0$. Since no multicast cells are scheduled for $t_0$, the resulting combined schedule is $U_0$.

Referring now to the next time slot, $t_1$, no multicast scheduling is performed, but the results of the previous multicast scheduling cycle, $M_0$, are fed into the unicast scheduling cycle. As a result, only those ports that are left unclaimed by $M_0$ are available for use by the unicast scheduling. The resulting unicast schedule, $U_1$, is therefore limited to filling in ports that were not matched during the earlier multicast scheduling cycle. In this manner, when both unicast and multicast cells are to be transferred during the same time slot, unicast cells are effectively treated as a lower priority than the previously scheduled multicast cells. Cell scheduling proceeds in a similar manner for the remaining time slots.

In alternative embodiments, multicast scheduling may be triggered differently than as described above. Bit positions in the multicast scheduling frequency register 1003 containing a '0' may cause multicast scheduling to be performed in the corresponding time slot while a '1' may inhibit multicast scheduling. Alternatively, as mentioned above, multicast scheduling may be triggered by a circular counter. For example, when the counter is incremented or decremented to a predetermined value this event may cause a multicast scheduling cycle to be performed. Additionally, in alternative embodiments, multicast scheduling may be performed more than one time slot in advance of its use. Further, while an eight bit register is depicted for purposes of illustration, registers of more or fewer bits may be used depending upon the needs of a particular implementation. Finally, although the examples only show control of multicast traffic, it is contemplated that the scheduling of unicast traffic may be similarly triggered (in addition to or instead of multicast traffic triggering) by employing a unicast scheduling frequency register (not shown).

Figure 11B:
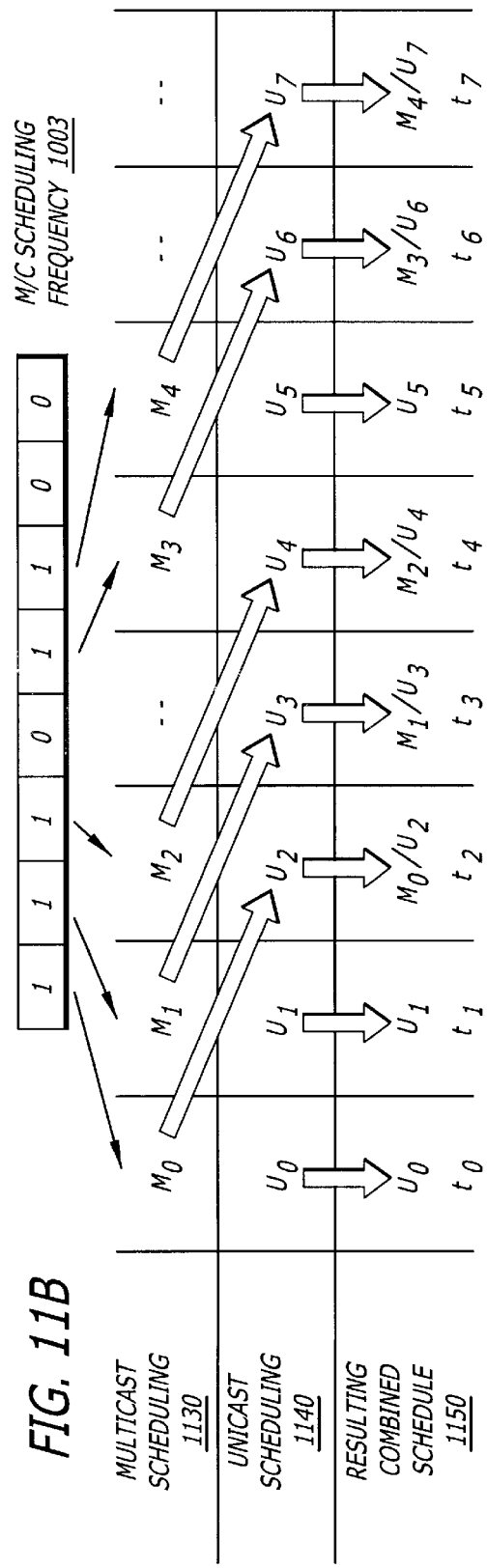
FIG. 11B conceptually illustrates a pipelined approach for scheduling multicast and unicast traffic according to one embodiment of the present invention.

Turning now to FIG. 11B, a pipelined approach for scheduling multicast and unicast traffic according to another embodiment of the present invention is conceptually illustrated. As in the previous example, unicast scheduling 1110 is performed during every time slot and if a bit position in the multicast scheduling frequency register 1003 contains a '1,' then multicast scheduling 1100 is also performed during the corresponding time slot; otherwise no multicast scheduling is performed during the time slot. Also, as above, multicast scheduling time slots occur as a subset of unicast scheduling time slots. This example illustrates that multicast scheduling 1110 may be performed more than one time slot in advance of the use of the resulting schedule. Additionally, multicast scheduling 1110 need not be symmetric or uniformly distributed. For example, multicast scheduling 1110 is not limited to being performed every other time slot as shown in FIG. 11A. Rather, if desired, multicast scheduling 1110 may be performed during two or more consecutive time slots, so long as during at least one time slot unicast traffic is given priority to ensure unicast traffic has adequate access to the fabric 120.

According to this example, during the first time slot, $t_0$, both multicast scheduling and unicast scheduling are performed in parallel. The multicast scheduling cycle produces a first multicast schedule, $M_0$, for use in time slot, $t_2$, and the unicast scheduling cycle produces a first unicast schedule, $U_0$, for the current time slot, $t_0$. Since no multicast cells are scheduled for t0, the resulting combined schedule is $U_0$. Multicast scheduling is performed for time slot t3 during time slot, t1. Again, since no multicast cells are scheduled for t1, the resulting combined schedule is $U_1$. The unicast scheduling cycle performed during time slot t2 is dependent upon the results of the previous multicast scheduling cycle, $M_0$ thereby giving the previously scheduled multicast cells priority over the unicast cells for the current time slot. Cell scheduling proceeds in a similar manner for the remaining time slots.

Back Pressure Handling

Because a head-of-line multicast cell can block the rest of the cells in the multicast queue, even though they are headed for different output ports, special handling of output port backpressure signals is needed to avoid the head-of-line blocking problem for multicast traffic to protect multicast performance. As described above, prior architectures typically backpressure the input ports directly from each of the output ports. Thus requiring knowledge/logic for backpressure handling at each of the input ports. In contrast, according to one embodiment of the present invention, the output ports 109, backpressure the fabric arbiter 110. Consequently, knowledge/logic for backpressure handling is centralized within the fabric arbiter 110 thereby reducing the complexity of the input ports 107.

Briefly, according to one embodiment, each time slot, the output ports 109 communicate an N-bit backpressure signal to the fabric arbiter 110 indicating whether or not one or more of the corresponding output queues has filled up. Then, the fabric arbiter 110 makes multicast scheduling decisions based upon the backpressure signal and the status of the multicast queues. According to one embodiment, the fabric arbiter 110 is configured to operate in one of two modes of operation with respect to a backpressuring output port. In the first mode of operation, the fabric arbiter obeys the backpressure signal and does not include the backpressuring output port in the fabric configuration. In the second mode of operation, the fabric arbiter solves the head-of-line blocking problem by ignoring the backpressure signal and causing the head-of-line multicast cells destined for the backpressuring output port to be transferred to the backpressuring output port regardless of the backpressure signal. When received by the backpressuring output port, the head-of-line multicast cell may be accepted if the output port has room or dropped. In this manner, multicast performance is protected by allowing the remainder of the multicast cells the opportunity to be transferred. According to one embodiment, in order to reduce oscillation of the backpressure signals from time slot to time slot, once a backpressure signal is asserted it is not de-asserted until a certain amount of time has passed or until the output queue size has fallen below a predetermined threshold. For example, de-assertion of the backpressure signal may be delayed until the backpressuring output queue is half-empty.

Figure 12:
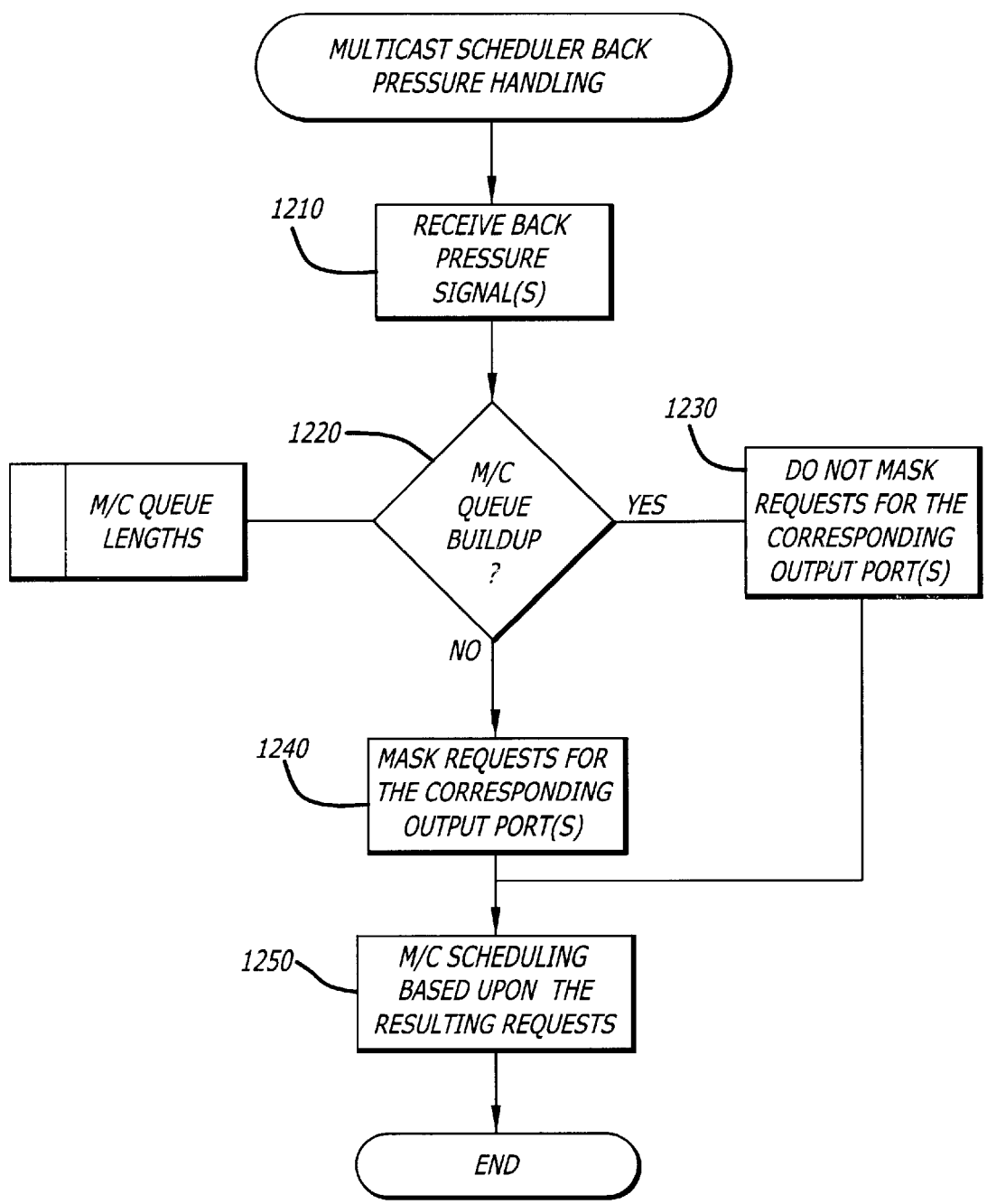
FIG. 12 is a flow diagram illustrating backpressure processing according to one embodiment of the present invention.

FIG. 12 is a flow diagram illustrating backpressure processing according to one embodiment of the present invention. At step 1210, the fabric arbiter 110 receives back pressure signals from the output ports 109. At step 1220, a determination is made whether or not to obey the backpressure signals based upon the size (length) of the multicast queues. If a multicast queue reaches a certain high watermark threshold, processing continues with step 1230. Otherwise, processing proceeds to step 1240.

At step 1230, requests associated with backpressuring output ports are not masked and are therefore considered eligible for multicast scheduling. In this manner, the head-of-line cell is sent to the destined output port(s) 109 regardless of the backpressure signal thereby removing the blockage and allowing the remaining multicast cells an opportunity to be scheduled for transfer across the fabric 120. At step 1240, no multicast build up has occurred, therefore, requests associated with backpressuring output ports are masked and are not considered by the multicast scheduler 215. After either of steps 1230 or 1240, processing continues with step 1250. At step 1250, multicast scheduling is performed based upon the requests that remain after step 1230 or 1240. Advantageously, one overloaded output port is prevented from adversely affecting other unrelated output ports.

Figure 13:
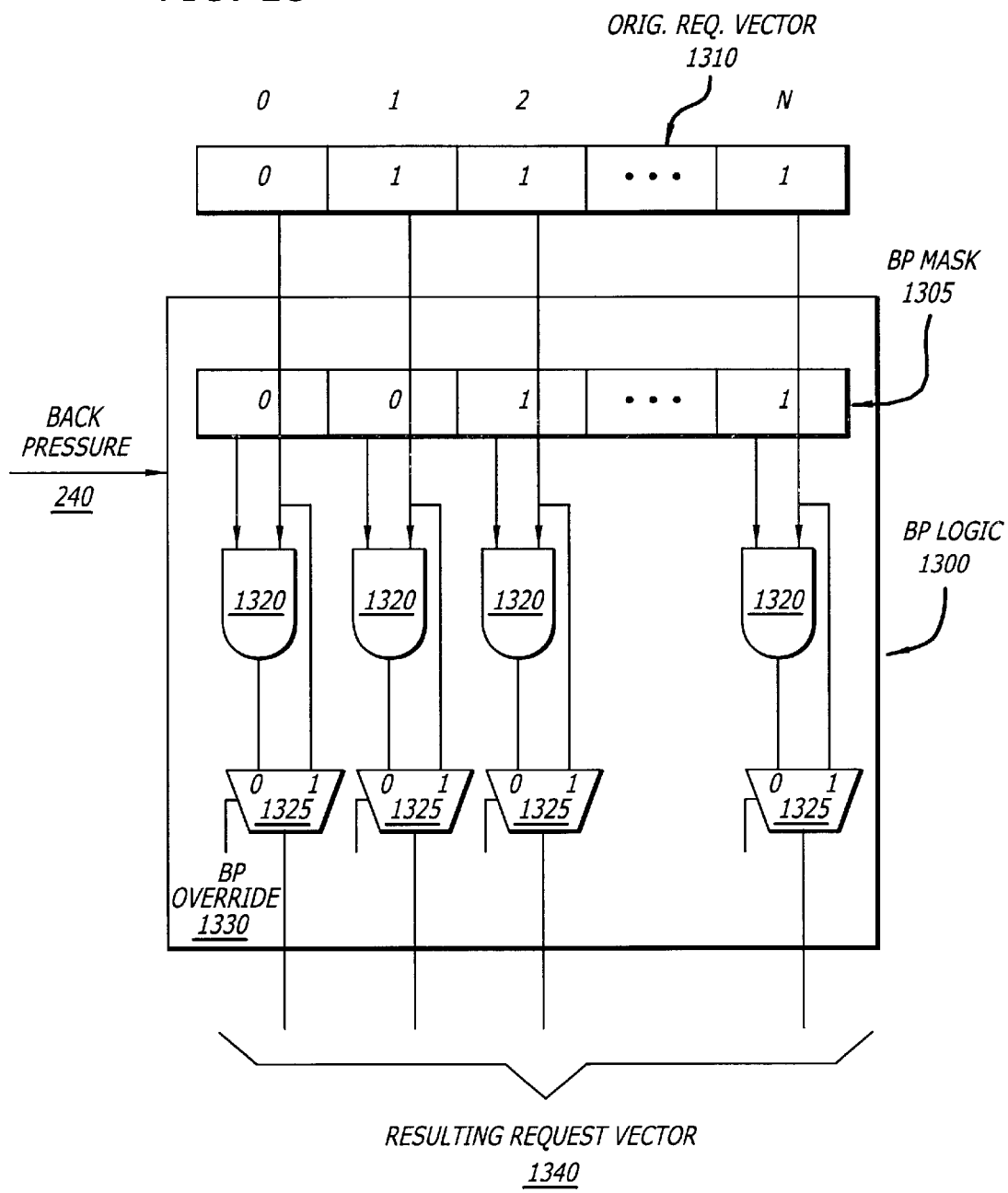
FIG. 13 is a block diagram of a hardware implementation of a portion of the backpressure logic according to one embodiment of the present invention.

Referring now to FIG. 13, a block diagram of an exemplary hardware implementation of a portion of backpressure logic 1300 will now briefly be described, according to one embodiment of the present invention. An original request vector 130 is masked or not based upon a backpressure override signal 1330 and a resulting request vector 1340 is output from the backpressure logic 1300. In this example, the backpressure logic 1300 comprises a backpressure mask 1305, N AND gates 1320, and N multiplexors 1325. In this example, a bit position of the backpressure mask 1305 contains a '0' if the corresponding output port/queue is backpressuring or a '1' if the output port/queue is not backpressuring. In this manner, the requests associated with backpressured output ports/queues can be masked off. However, the backpressure override signals 1330 allow one or more of the original request vector positions to be passed through unchanged in the case of multicast queue buildup at an input port, for example.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:

receiving transmit requests associated with a plurality of input ports, the transmit requests identifying those of a plurality of output ports to which pending multicast cells are ready to be transmitted across a fabric of a network device;

receiving a backpressure signal from a backpressuring output port of the plurality of output ports;

determining a state of a multicast queue associated with the network device; and scheduling multicast cells for transmission across the fabric to the backpressuring output port based upon the state of the multicast queue, if the scheduling is to be performed during a current time slot.

2. The method of claim 1, wherein the scheduling of the multicast cells comprises:

ignoring the backpressure signal and transferring a head-of-line multicast cell from the multicast queue if the state is a first predetermined state; and preventing the multicast cells from being transferred to the backpressuring output port by masking those of the transmit requests destined for the backpressuring output port to prevent the backpressuring output port from being considered during scheduling if the state is a second predetermined state.

3. A method, comprising:

performing unicast cell scheduling for a set of scheduling timeslots;

performing multicast cell scheduling in parallel with and independent of the unicast cell scheduling;

receiving a transmit request associated with each of a plurality of input ports, the transmit request identifying those of a plurality of output ports to which pending multicast cells are ready to be transmitted across a fabric of a network device;

receiving a backpressure signal from a backpressuring output port;

determining a size of a multicast queue associated with the network device; and scheduling multicast cells for transmission across the fabric to the backpressuring output port based on the size of the multicast queue.

4. The method of claim 3, wherein the performing of the multicast cell scheduling occurs during scheduling timeslots in which a programmable multicast scheduling frequency parameter satisfies a predetermined condition.

5. The method of claim 3, wherein the receiving of the transmit request, the receiving of the backpressure signal, and the scheduling of the multicast cells is conducted at a fabric arbiter of the network device.

6. The method of claim 5, wherein the scheduling of the multicast cells comprises:

ignoring the backpressure signal and transferring a head-of-line multicast cell from the multicast queue if the size of the multicast queue exceeds a predetermined threshold; and preventing multicast cells from being transferred to the backpressuring output port by masking requests destined for the backpressuring output port to prevent the backpressuring output port from being considered during scheduling if the size of the multicast queue does not exceed the predetermined threshold.

7. A network device, comprising:

a plurality of input ports;

a plurality of output ports coupled with the plurality of input ports; and a fabric to couple the plurality of input ports to the plurality of output ports, the fabric to receive a transmit request associated with at least one of the plurality of input ports, the transmit request identifying at least one output port of the plurality of output ports to which pending multicast cells are ready to be transmitted across the fabric, to receive a backpressure signal from a backpressuring output port of the plurality of output ports, to determine a state of a multicast queue associated with the network device, and to schedule multicast cells for transmission across the fabric to the backpressuring output port based upon the state of the multicast queue.

8. The network device of claim 7, wherein the fabric is coupled to each of the plurality of input ports.

9. The network device of claim 7, wherein the fabric is coupled to each of the plurality of output ports.

10. A network device, comprising:

a plurality of input ports residing on a plurality of line cards;

a plurality of output ports coupled with the input ports, the plurality of output ports to assert a backpressure signal when an associated output queue size exceeds a first predetermined threshold and de-assert the backpressure signal when the associated output queue falls below a second predetermined threshold;

a fabric to couple the plurality of input ports with the plurality of output ports, the fabric to obey the backpressure signal when performing unicast cell scheduling and to obey or ignore the backpressure signal when performing multicast cell scheduling depending on the status of a multicast queue.

11. The network device of claim 10, further comprises a switch fabric coupled with the plurality of line cards, the switch fabric to allow transfer of data between the plurality of input ports and the plurality of output ports.

12. The network device of claim 10, wherein the fabric comprises a fabric arbiter to receive the backpressure signal from the plurality of output ports.

* * * * *